United States Patent
Hampel et al.

(10) Patent No.: US 10,375,707 B2
(45) Date of Patent: Aug. 6, 2019

(54) DYNAMIC RESOURCE ALLOCATION IN WIRELESS NETWORK

(71) Applicant: QUALCOMM Incorporated, San Diego, CA (US)

(72) Inventors: Karl Georg Hampel, New York, NY (US); Junyi Li, Chester, NJ (US); Sundar Subramanian, Bridgewater, NJ (US); Muhammad Nazmul Islam, Edison, NJ (US); Navid Abedini, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/412,367

(22) Filed: Jan. 23, 2017

(65) Prior Publication Data
US 2018/0042031 A1 Feb. 8, 2018

Related U.S. Application Data

(60) Provisional application No. 62/370,860, filed on Aug. 4, 2016.

(51) Int. Cl.
*H04B 7/00* (2006.01)
*H04W 72/12* (2009.01)
(Continued)

(52) U.S. Cl.
CPC .......... *H04W 72/12* (2013.01); *H04W 72/04* (2013.01); *H04W 72/1278* (2013.01); *H04W 92/20* (2013.01)

(58) Field of Classification Search
CPC ... H04W 84/04; H04W 84/047; H04W 88/04; H04W 92/14
(Continued)

(56) References Cited

U.S. PATENT DOCUMENTS

| 7,948,942 B2* | 5/2011 | Zhang | .................. H04W 16/06 370/328 |
| 8,514,768 B2* | 8/2013 | Noh | .................... H04L 27/2605 370/315 |

(Continued)

FOREIGN PATENT DOCUMENTS

| EP | 3113533 A1 | 1/2017 |
| EP | 3190818 A1 | 7/2017 |

(Continued)

OTHER PUBLICATIONS

Interdigital Communications, LLC, "FDD Relay Type I HARQ Operation and RTT," 3GPP TSG-RAN WG1 Meeting #59bis, R1-100290, Valencia, Spain, Jan. 18-22, 2010, 18 pgs., XP050417967, 3rd Generation Partnership Project.

(Continued)

Primary Examiner — Dmitry Levitan
(74) Attorney, Agent, or Firm — Holland & Hart LLP

(57) ABSTRACT

Methods, systems, and devices for wireless communication are described. In particular, a backhaul network that may be established between access nodes and/or base stations is shown and described. To support communications via the backhaul network, a synchronized frame structure and unique network topologies may be established. Resources may be allocated to different wireless communication links based on the synchronized frame structure. Occupancy/availability indications are shown and described, which enable the local redistribution of resources to account for variations in signal quality and/or variations in traffic experienced by the backhaul network.

30 Claims, 16 Drawing Sheets

(51) Int. Cl.
*H04W 72/04* (2009.01)
*H04W 92/20* (2009.01)

(58) Field of Classification Search
USPC ............... 370/310, 315, 321, 322, 326, 327
See application file for complete search history.

(56) References Cited

U.S. PATENT DOCUMENTS

| | | | | |
|---|---|---|---|---|
| 8,634,842 | B2* | 1/2014 | Zhang | H04W 28/08 |
| | | | | 370/315 |
| 8,737,289 | B2* | 5/2014 | Seo | H04L 5/001 |
| | | | | 370/315 |
| 8,755,324 | B2* | 6/2014 | Yu | H04W 72/085 |
| | | | | 370/315 |
| 8,792,411 | B2* | 7/2014 | Noh | H04B 7/2606 |
| | | | | 370/315 |
| 8,811,262 | B2* | 8/2014 | Chung | H04B 7/15542 |
| | | | | 370/315 |
| 8,848,596 | B2* | 9/2014 | Shin | H04B 7/15528 |
| | | | | 370/293 |
| 8,964,626 | B2* | 2/2015 | Seo | H04B 7/15528 |
| | | | | 370/315 |
| 9,007,992 | B2* | 4/2015 | Charbit | H04B 7/15557 |
| | | | | 370/328 |
| 9,084,246 | B2* | 7/2015 | Lee | H04B 7/155 |
| 9,215,057 | B2* | 12/2015 | Wager | H04B 7/14 |
| 9,749,099 | B2* | 8/2017 | Seo | H04L 5/001 |
| 2013/0142136 | A1* | 6/2013 | Pi | H04W 28/0289 |
| | | | | 370/329 |
| 2013/0315109 | A1* | 11/2013 | Raaf | H04B 7/15528 |
| | | | | 370/277 |
| 2015/0304014 | A1* | 10/2015 | Sadeghi | H04J 13/004 |
| | | | | 370/315 |
| 2016/0219584 | A1* | 7/2016 | Bertrand | H04L 5/00 |
| 2017/0006627 | A1* | 1/2017 | Huang | H04W 16/32 |
| 2017/0353863 | A1* | 12/2017 | Shi | H04W 16/10 |
| 2018/0042031 | A1* | 2/2018 | Hampel | H04W 72/04 |

FOREIGN PATENT DOCUMENTS

| | | |
|---|---|---|
| WO | WO-2015127618 A1 | 9/2015 |
| WO | WO-2015154599 A1 | 10/2015 |

OTHER PUBLICATIONS

ISA/EP, International Search Report and Written Opinion of the International Searching Authority, Int'l Application No. PCT/US2017/041310, dated Oct. 18, 2017, European Patent Office, Rijswijk, NL, 16 pgs.

* cited by examiner

DYNAMIC RESOURCE ALLOCATION IN WIRELESS NETWORK

CROSS REFERENCE

The present Application for Patent claims priority to U.S. Provisional Patent Application No. 62/370,860 by Hampel, et al., entitled "Dynamic Resource Allocation In Wireless Network," filed Aug. 4, 2016, assigned to the assignee hereof.

BACKGROUND

The following relates generally to wireless communication, and more specifically to dynamic resource allocation in a wireless network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of access nodes, each simultaneously supporting communication for multiple communication devices, which may be otherwise known as user equipment (UE).

Wireless communications systems may include access nodes to facilitate wireless communication between user equipment and a network. For example, an LTE base station may provide a mobile device access to the internet via the LTE wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impracticable to connect each access node to the network via a wired connection.

SUMMARY

The described techniques provide for a backhaul network that may be established between access nodes and/or base stations. To support communications via the backhaul network, a synchronized frame structure and unique network topologies may be established. Resources may be allocated to different wireless communication links based at least in part on the synchronized frame structure. Occupancy/availability indications are shown and described, which enable the local redistribution of resources to account for variations in signal quality and/or variations in traffic experienced by the backhaul network.

A method of wireless communication is described. The method may include determining whether data is available to be transmitted via a first communication link using a radio access technology (RAT) that supports a synchronized frame structure, receiving an indication whether a scheduled resource of a second communication link is available during a time interval defined by the synchronized frame structure, and transmitting the data via the first communication link using the scheduled resource during the time interval based at least in part on the indication indicating that the scheduled resource of the second communication link is available during the time interval.

An apparatus for wireless communication is described. The apparatus may include means for determining whether data is available to be transmitted via a first communication link using a radio access technology (RAT) that supports a synchronized frame structure, means for receiving an indication whether a scheduled resource of a second communication link is available during a time interval defined by the synchronized frame structure, and means for transmitting the data via the first communication link using the scheduled resource during the time interval based at least in part on the indication indicating that the scheduled resource of the second communication link is available during the time interval.

Another apparatus for wireless communication is described. The apparatus may include a processor, memory in electronic communication with the processor, and instructions stored in the memory. The instructions may be operable to cause the processor to determine whether data is available to be transmitted via a first communication link using a radio access technology (RAT) that supports a synchronized frame structure, receive an indication whether a scheduled resource of a second communication link is available during a time interval defined by the synchronized frame structure, and transmit the data via the first communication link using the scheduled resource during the time interval based at least in part on the indication indicating that the scheduled resource of the second communication link is available during the time interval.

A non-transitory computer-readable medium for wireless communication is described. The non-transitory computer-readable medium may include instructions operable to cause a processor to determine whether data is available to be transmitted via a first communication link using a radio access technology (RAT) that supports a synchronized frame structure, receive an indication whether a scheduled resource of a second communication link is available during a time interval defined by the synchronized frame structure, and transmit the data via the first communication link using the scheduled resource during the time interval based at least in part on the indication indicating that the scheduled resource of the second communication link is available during the time interval.

Some examples of the method, apparatus, and non-transitory computer-readable medium described above may further include processes, features, means, or instructions for receiving a second indication being indicative of whether a scheduled resource of a third communication link may be available during the time interval. Some examples of the method, apparatus, and non-transitory computer-readable medium described above may further include processes, features, means, or instructions for transmitting the data via the first communication link during the time interval may be further based at least in part on the second communication link and the third communication link being available during the time interval.

Some examples of the method, apparatus, and non-transitory computer-readable medium described above may further include processes, features, means, or instructions for receiving a second indication being indicative of whether a scheduled resource of a third communication link may be available during a second time interval. Some examples of the method, apparatus, and non-transitory computer-readable medium described above may further include processes, features, means, or instructions for transmitting the data via the first communication link during the second time interval based at least in part on the third communication link being available during the second time interval.

Some examples of the method, apparatus, and non-transitory computer-readable medium described above may further include processes, features, means, or instructions for forwarding the indication based at least in part on what entity schedules transmissions on the first communication link.

Some examples of the method, apparatus, and non-transitory computer-readable medium described above may further include processes, features, means, or instructions for determining an availability of a scheduled resource for transmission of data on the first communication link. Some examples of the method, apparatus, and non-transitory computer-readable medium described above may further include processes, features, means, or instructions for transmitting a second indication based at least in part on a scheduled resource of the first communication link being available.

In some examples of the method, apparatus, and non-transitory computer-readable medium described above, a first wireless node receives the indication from a second wireless node.

Some examples of the method, apparatus, and non-transitory computer-readable medium described above may further include processes, features, means, or instructions for implementing, at the first wireless node, an access node function (ANF) for the first communication link that allows the first wireless node to schedule transmissions on the first communication link. Some examples of the method, apparatus, and non-transitory computer-readable medium described above may further include processes, features, means, or instructions for implementing, at the first wireless node, a user equipment function (UEF) for the second communication link, the UEF allowing the first wireless node to communicate via the second communication link, wherein the first wireless node implements simultaneously the ANF for the first communication link and a UEF for the second communication link.

In some examples of the method, apparatus, and non-transitory computer-readable medium described above, the second wireless node implements an ANF for the second communication link that allows the second wireless node to schedule transmissions on the second communication link.

In some examples of the method, apparatus, and non-transitory computer-readable medium described above, the second wireless node transmits the indication if the scheduled resource of the second communication link may be available during the time interval.

Some examples of the method, apparatus, and non-transitory computer-readable medium described above may further include processes, features, means, or instructions for implementing, at the first wireless node, a UEF for the first communication link. Some examples of the method, apparatus, and non-transitory computer-readable medium described above may further include processes, features, means, or instructions for implementing, at the first wireless node, a UEF for the second communication link. Some examples of the method, apparatus, and non-transitory computer-readable medium described above may further include processes, features, means, or instructions for transmitting, by the first wireless node, a second indication received via the first communication link to the second wireless node via the second communication link.

In some examples of the method, apparatus, and non-transitory computer-readable medium described above, the indication includes identifying information about a scheduled resource defined by the synchronized frame structure.

In some examples of the method, apparatus, and non-transitory computer-readable medium described above, the synchronized frame structure may be for uplink transmissions and downlink transmissions and defines the scheduled resources, each scheduled resource including a control portion and a data portion. In some examples of the method, apparatus, and non-transitory computer-readable medium described above, the indication may be transmitted via the control portion.

Some examples of the method, apparatus, and non-transitory computer-readable medium described above may further include processes, features, means, or instructions for transmitting the data via the first communication link during the time interval further comprises: transmitting via the first communication link during only the data portion of the scheduled resource of the time interval.

In some examples of the method, apparatus, and non-transitory computer-readable medium described above, transmitting the data via the first communication link during the time interval further comprises: transmitting uplink control data during a first portion of the data portion of the scheduled resource of the time interval. Some examples of the method, apparatus, and non-transitory computer-readable medium described above may further include processes, features, means, or instructions for transmitting the data during a second portion of the data portion of the scheduled resource of the time interval.

In some examples of the method, apparatus, and non-transitory computer-readable medium described above, a first subset of scheduled resources defined by the synchronized frame structure may be assigned to be used by the first communication link and a second subset of scheduled resources defined by the synchronized frame structure may be assigned to be used by the second communication link, the first subset being different than the second sub set.

In some examples of the method, apparatus, and non-transitory computer-readable medium described above, the first subset or the second subset of scheduled resources includes at least one of a time interval, a frequency band, a code, an antenna beam, or a combination thereof.

In some examples of the method, apparatus, and non-transitory computer-readable medium described above, one of the first communication link or the second communication link may be a wireless backhaul link. In some examples of the method, apparatus, and non-transitory computer-readable medium described above, the RAT comprises a millimeter wave RAT.

DETAILED DESCRIPTION

Figure 1:
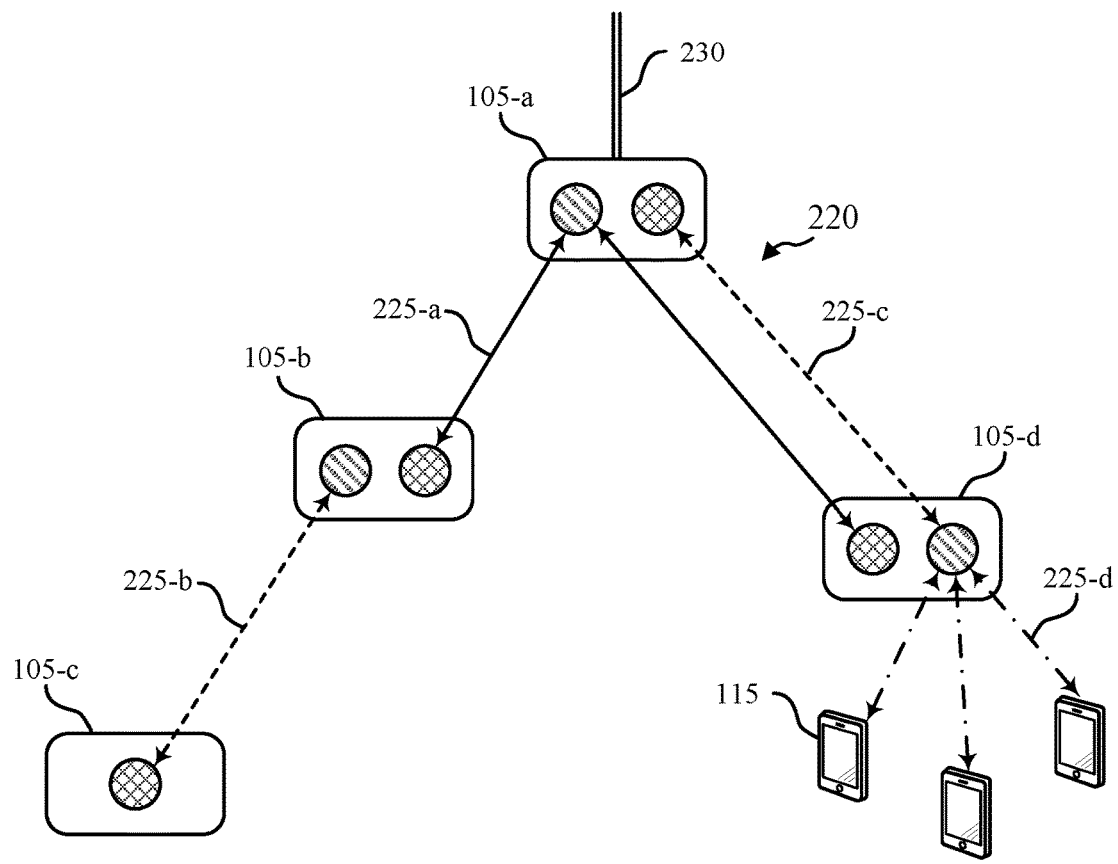
FIG. 1 illustrates an example of a system for wireless communication that supports dynamic resource allocation in a wireless network in accordance with aspects of the present disclosure.

According to some aspects of the disclosure, wireless backhaul links may be used to couple an access node (AN) to a network in place of high-capacity, wired backhaul link (e.g., fiber). For example, a first AN may establish a wireless backhaul link to a second AN, which has a high-capacity, wired backhaul link. In this manner, the first AN may communicate access traffic to the network via the second AN through the combination of the wireless backhaul link and the wired backhaul link. In some examples, a backhaul network may use multiple wireless backhaul links before reaching a wired backhaul link. The backhaul network should also provide robustness via topological redundancy. In such an ad-hoc network, large-scale resource coordination schemes may be necessary.

Such a backhaul network, however, may also present some disadvantages for providing network access. First, such large-scale coordination schemes tend to be inflexible to local variations in load or channel conditions. In a backhaul network, each AN has equal permissions to send and receive. As a result, the link between each AN may be symmetric. However, such a symmetry in links may create large amounts of signaling to mediate conflicts that may arise in the backhaul links. Second, wireless backhaul links may interfere with the access networks supported by each AN. For example, a wireless backhaul link may interfere with a wireless communication link established between the AN and user equipment (UE).

Techniques are described to address some of the shortcomings of a backhaul network. To address the inflexibility of large-scale communication schemes, a backhaul network may be configured to allow an AN to release resources to other ANs via an occupancy/availability signaling scheme. When the load conditions change or when the network topology changes, e.g., due to changes in channel conditions, link failure or addition/departure of nodes, the network-wide resource plan may become suboptimal. Due to its network-wide extension, updating the resource plan may require significant signaling overhead and may take a considerable amount of time. It may therefore be desirable to have a mechanism to swiftly and locally shift resources in response to availability and demand.

A number of wireless backhaul links may be established between ANs. Each wireless backhaul link may be pre-assigned a resource based on a synchronized frame structure, a resource plan, or a schedule. To reduce overhead in establishing and maintaining wireless backhaul links between ANs, an asymmetric link may be established between ANs. Each wireless backhaul link in the backhaul network may be terminated by an Access-Node Function (ANF) at a first AN and a UE-Function (UEF) at a second AN. The ANF may control resource allocation on the link based on a large-scale resource schedule. The UEF may communicate using the link, after receiving the permission of the link's ANF. If an ANF determines that it is not using one of its assigned resources for a certain time period, the ANF may make the resource available to neighboring wireless backhaul links by signaling availability/occupancy indications to neighboring ANs.

To reduce interference with other signals, frequencies different from those used for the access network may be used to establish wireless backhaul links. For example, millimeter waves, such as those used in 5G cellular technologies, may be used to establish wireless backhaul links between ANs. In addition, beamforming techniques may be used to direct a wireless communication link to a neighboring AN. It should be appreciated that wireless links between ANs are suitable for beamforming techniques because ANs are stationary (i.e., they do not change physical locations) and ANs may have large antenna arrays that may be capable of producing highly focused pencil beams.

Aspects of the disclosure are initially described in the context of a wireless communications system. Aspects of the disclosure are further illustrated by and described with reference to apparatus diagrams, system diagrams, and flowcharts that relate to dynamic resource allocation in a wireless network.

FIG. 1 illustrates an example of a wireless communications system 100 in accordance with various aspects of the present disclosure. The wireless communications system 100 includes access nodes 105, UEs 115, and a core network 130. In some examples, the wireless communications system 100 may be a 5G, LTE, or LTE-Advanced network. Wireless communications system 100 may support one or more node functions that enable resource allocation and scheduling between access nodes 105.

Access nodes 105 may wirelessly communicate with UEs 115 via one or more access node antennas. Each access node 105 may provide communication coverage for a respective geographic coverage area 110. Communication links 125 shown in wireless communications system 100 may include UL transmissions from a UE 115 to an access node 105, or DL transmissions, from an access node 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Access nodes 105 may communicate with the core network 130 and with one another. For example, access nodes 105 may interface with the core network 130 through a first set of backhaul links 132 (e.g., S1, etc.). Access nodes 105 may communicate with one another over a second set of backhaul links 134 (e.g., X2, etc.) either directly or indirectly (e.g., through core network 130). Such backhaul links 134 may be wired or wireless. In addition, such backhaul links 134 may form an ad-hoc backhaul network to rely traffic from an originating access node 105 to an access node 105 with a wired connection to the desired network. Access nodes 105 may perform radio configuration and scheduling for communication with UEs 115, or may operate under the control of an access node controller (not shown). In some examples, access nodes 105 may be macro cells, small cells, hot spots, or the like. Access nodes 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of access nodes, each simultaneously supporting communication for one or more multiple communication devices, which may be otherwise known as a user equipment (UE).

Some wireless communications systems may operate in millimeter wave (mmW) frequency ranges, e.g., 28 GHz, 40 GHz, 60 GHz, etc. Wireless communication at these frequencies may be associated with increased signal attenuation, e.g., path loss, which may also be influenced by various factors, such as temperature, barometric pressure, diffraction, etc. As a result, signal processing techniques, such a beamforming, may be used to coherently combine energy and overcome path losses at these frequencies. Further, wireless communication links achieved through beamforming may be associated with narrow beams (e.g., "pencil beams") that are highly directional, minimize inter-link interference, and provide high-bandwidth links between access nodes. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may be directed to one wireless device at a time due to the directionality of the transmitted signal.

Wireless communications networks may employ backhaul links (e.g., backhaul link 132 or backhaul link 134) as a connection between a core network and wireless nodes within the wireless communications network. For example, wireless communications system 100 may include multiple access nodes 105 (e.g., base stations, remote radio heads, etc.), where at least one access node 105 is coupled to a wireline backhaul link, such as an optical fiber cable. However, due to the widespread deployment of access nodes 105 within a given region, installing wireline backhaul links to each access node 105 within a network may be cost prohibitive. Therefore, some of the access nodes 105 within wireless communications system 100 may not be directly coupled to the core network 130 or to another access node 105 via a wired backhaul link, and may use other means, such as wireless backhaul links, to communicate backhaul traffic. For instance, cellular RATs may be used to provide backhaul links between multiple access nodes 105 and a core network 130. In such cases, the access nodes 105 may wirelessly communicate backhaul access traffic to a high-capacity fiber point (e.g., a location where a wireless node is coupled with a wireline link to core network 130).

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

In some cases, cellular RATs, such as mmW-based RATs, may be used to support access traffic between UEs 115 and access nodes 105, in addition to backhaul access traffic among multiple access nodes 105. Moreover, both access and backhaul traffic may share the same resources (e.g., as in the case of integrated access and backhaul (TAB)). Such wireless backhaul or TAB solutions may be increasingly beneficial with the evolution of cellular technologies due to enhancements in wireless link capacity and reduction in latency. Further, the use of wireless backhaul links may reduce the cost of dense small cells deployments.

In some cases, an access link using a mmW-based RAT may be designed as an asymmetric single-hop link, which may be used for assigning control and scheduling tasks to an access node 105 while providing instruction to one or more UEs 115 for scheduling communication. In such cases, an access node 105 may coordinate wireless resources among multiple UEs 115, while each UE 115 may be assigned to one access node 105 at a time. In some cases, inter-access node links may be symmetric in nature and may form mesh topologies for enhanced robustness, where wireless transport may occur along multiple hops.

Thus, using a RAT may enable wireless backhaul communication using one or more node functions at a wireless node, such as a base station or access node. Additionally, multiple wireless nodes may communicate in a backhaul network using a schedule that is aligned with a frame structure. For example, a wireless node may establish a link with different wireless nodes using a RAT that supports a synchronized frame structure, such as a mmW RAT. The wireless nodes may instantiate one or more node functions, such as an ANF and a UEF. The wireless nodes may then communicate according to active and suspended modes using the node functions, where the communication is based on a schedule aligned with the frame structure.

In addition, occupancy/availability signaling may be used to enable dynamic resource allocation of the resources defined in the synchronized frame structure between different wireless communication links. For example, if a particular wireless communication link is not using some of its dedicated resources, it may signal to neighboring communication links that such resources are available to be used.

Upon receiving an indication signal that non-dedicated resources are available to be used, the neighboring communication link may schedule data to be transmitted using those available resources.

Figure 2:
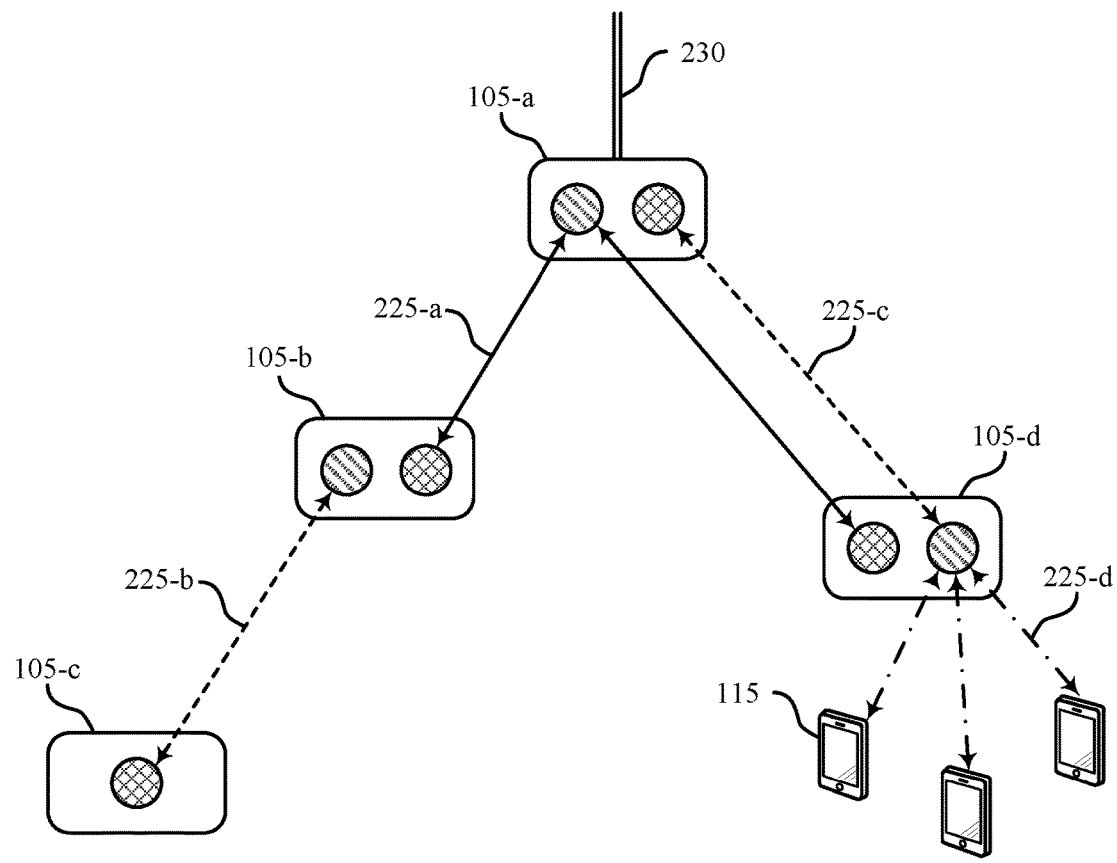
FIG. 2 illustrates an example of a communications network that supports dynamic resource allocation in a wireless network in accordance with aspects of the present disclosure.

FIG. 2 illustrates an example of a backhaul network 200 for dynamic resource allocation in a wireless network. In some cases, backhaul network 200 may be an example of a wireless communications network that communicates using mmW frequency ranges. The backhaul network 200 may include a number of access nodes 105 that communicate over a number of different communication links 220, where the communication links 220 may be associated with a same or different set of wireless resources. The access nodes 105 may be examples of the access nodes 105 described in reference to FIG. 1. The backhaul network 200 may support the use of one or more node functions to enable efficient resource allocation for wireless backhaul communications. In such cases, the access nodes 105 may instantiate one or more node functions to coordinate signaling and resource allocation. That is, the access nodes 105 may instantiate one or more ANFs 205, one or more UEFs 210, or any combination thereof.

For example, access node 105-a may be located at a central point of a star, and may be coupled with a wireline backhaul link 230 (i.e., an optical fiber cable). In some cases, access node 105-a may be the only access node 105 in backhaul network 200 that is coupled with the wireline backhaul link 230. Access node 105-a may instantiate an ANF 205, and the access nodes 105 at the leaves of the star (access node 105-b and access node 105-c) may each instantiate a UEF 210. Access node 105-a may then communicate with access node 105-b and access node 105-c using communication link 225-a according to an active mode or a suspended mode using the node functions. In some cases, communication link 225-a may be associated with a first set of wireless resources.

The ANF 205 and the UEFs 210 may be assigned the same functionalities and signaling protocols for resource allocation as defined by a RAT. That is, resource coordination of a backhaul star can be managed via the RAT, such as a mmW RAT. Furthermore, wireless resource use among access nodes 105 within a star may be coordinated via a large-scale (e.g., network-wide) schedule. Within each star, signaling and resource management may be regulated by the RAT and a resource sub-schedule may be generated by a star's ANF 205 (such as the ANF 205 instantiated at access node 105-a).

In some examples, access node 105-b may instantiate an ANF 205 in addition to the UEF 210. Access node 105-b may accordingly communicate with access node 105-c using communication link 225-b according to an active or a suspended mode using the node functions. In some cases, communication link 225-b may be associated with a second set of wireless resources.

In another example, access node 105-d may instantiate an ANF 205 and communicate with a UEF 210 at access node 105-a over communication link 225-c. In some examples, communication link 225-c may be associated with the second set of resources. That is, communication link 225-c may use the same resources as communication link 225-b. Additionally, the ANF 205 at access node 105-d may be used for mobile access, where access node 105-d may communicate with one or more UEs 115 over communication link 225-d. As a result, access node 105-d may forward data between the one or more UEs 115 and access node 105-a. Accordingly, IAB may be accomplished by including the additional star with access node 105-d at the center and the UEs 115 at the leaves of the star.

In some cases, ANFs 205 may support transmission of a downlink control channel, reception of an uplink control channel, scheduling of downlink and uplink data transmission within a resource space assigned to a link or to a set of links, transmission of synchronization signals and cell reference signals (e.g., as a primary synchronization symbol (PSS) or secondary synchronization symbol (SSS) on a synchronization channel), transmitting beam sweeps, and transmitting downlink beam change requests. Additionally, UEFs 210 may support reception of a downlink control channel, transmission of a uplink control channel, requesting scheduling of uplink data transmissions, transmission of random access preambles on a random access channel, listening to beam sweeps and reporting beam indexes and beam signal strength detected, and executing downlink beam change requests. In some cases, there may be other features that differentiate the ANF and the UEF implemented at a node. As described above, an access node 105 node may implement a combination of one or more node functions, such as multiple ANFs 205, multiple UEFs 210, or combinations thereof.

Figure 3:
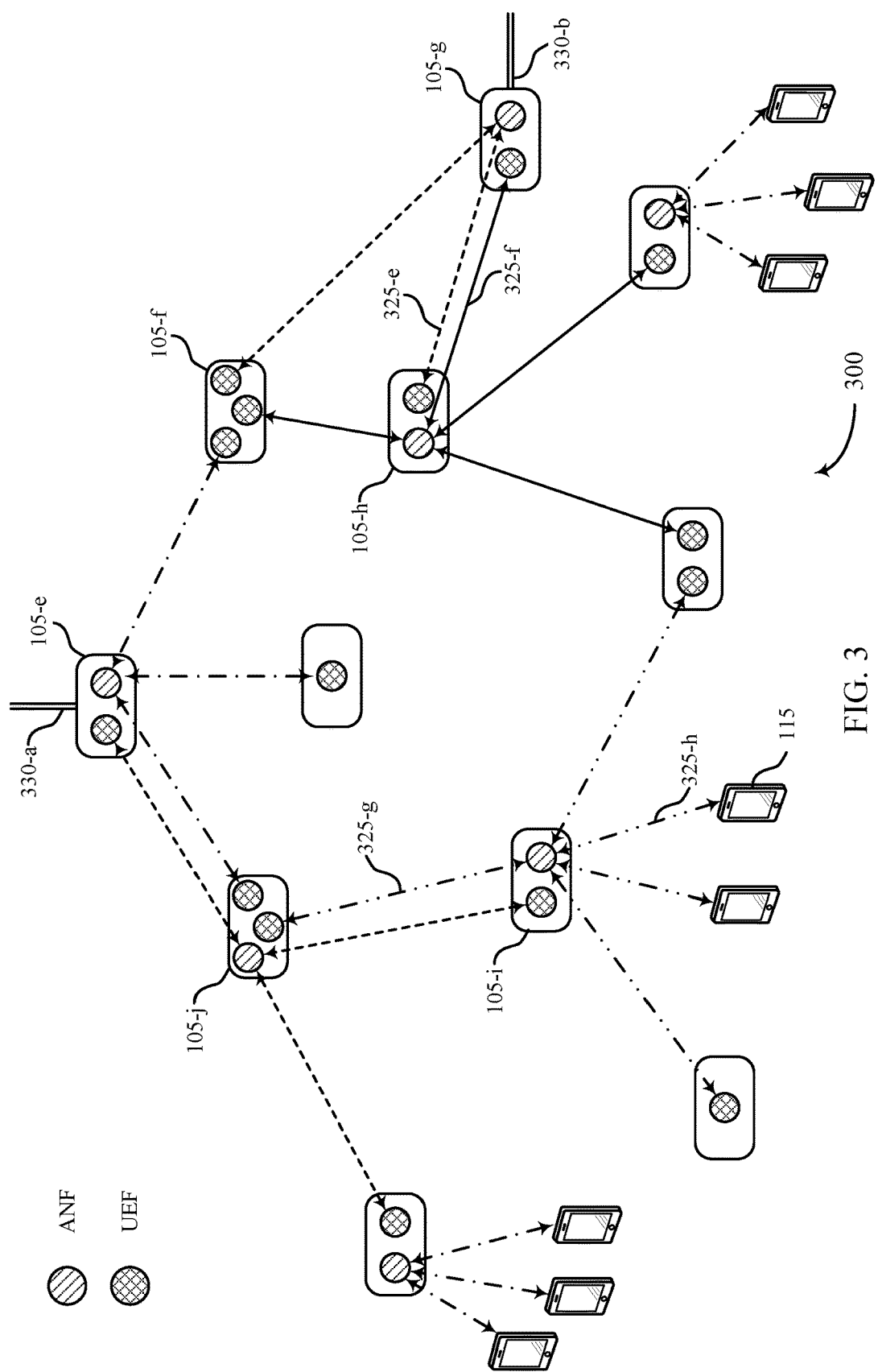
FIG. 3 illustrates an example of a communications network that supports dynamic resource allocation in a wireless network in accordance with aspects of the present disclosure.

FIG. 3 illustrates an example of a backhaul network 300 for dynamic resource allocation in a wireless network. In some cases, the backhaul network 300 may be an example of a wireless communications network that communicates using mmW frequency ranges. The backhaul network 300 may include a number of access nodes 105 that communicate over a number of different communication links 325, where the communication links 325 may be associated with a same or different set of wireless resources. The access nodes 105 may be examples of the access nodes 105 described in reference to FIGS. 1 and/or 2. The backhaul network 300 may be an example of a wireless communications system that supports multiple hops and topological redundancy for backhaul links using a RAT.

In some examples, complex backhaul topologies may be handled by composing the topology from multiple stars that mutually overlap. For instance, backhaul network 300 may comprise a mesh topology with two interfaces to a wireline network (e.g., access nodes 105-e and 105-g coupled with wireline backhaul links 330-a and 330-b). Such a topology may comprise multiple stars, where some stars mutually overlap. An ANF may be allocated to an access node 105 at the center of each star (e.g., access nodes 105-e, 105-g, 105-h, etc.,) and further includes a UEF at the access node 105 at each of the leaves. As a result, a backhaul node may include multiple ANFs and UEFs.

For example, access node 105-f may include multiple instances of a UEF, where it may communicate with the ANFs at access nodes 105-e, 105-g, and 105-h. Additionally, access nodes 105-g and 105-h may each communicate with each other using at least one ANF and at least one UEF, and may form overlapping stars. In such cases, access node 105-g and access node 105-h may communicate over communication links 325-e and 325-f that provide topological redundancy for the backhaul network 300. In some cases, communication links 325-e and 325-f may be associated with different sets of resources, where the resources are cooperatively allocated according to a schedule established by the ANFs. Multiple stars may use techniques to coordinate wireless resources, which may efficiently handle any system constraints (e.g., half-duplexed communications, inter-link interference, etc.). For instance, inter-link interference may be managed using spatial division multiple access (SDMA) techniques (e.g., through the use of narrow beams), and inter-node beam coordination may account for any remaining interference.

Additionally or alternatively, mobile access may be integrated into such a star topology through additional stars with UEs 115 at their leaves and an access node 105 at their center. In some examples, mobile access links may also be added to existing stars. In an example, access node 105-*i* may communicate with access node 105-*j* using communication link 325-*g*. Access node 105-*i* may further communicate with one or more UEs 115 over communication links 325-*h*. In this example, communication links 325-*g* and 325-*h* both share the same set of wireless resources to provide integrated access and backhaul. As can be seen in FIG. 3, a range of ANF and UEF combinations may be instantiated in an access node 105. Additional or different combinations of UEF and ANF instances in access nodes 105, as well as different topologies not shown in FIG. 3, may be possible.

To coordinate timing of transmission and reception, all links may be coordinated using time synchronization, where a frame structure supported by a cellular RAT may be used. For instance, time synchronization may be achieved through a determination of timing parameters associated with another wireless node, e.g., another wireless node may transmit an indication of synchronization signal transmission timing. In some examples, further coordination between wireless nodes may be used since different wireless nodes may implement multiple ANFs and/or UEFs.

In some examples, access node 105 may include multiple node function instances, which may further use a routing function that makes decisions on forwarding of data among node functions residing on the same node. The routing function may be executed or instantiated, for example, on any one of a number of protocol layers (e.g., the routing function may be executed on an Internet Protocol (IP) layer). In some cases, the access node 105 may access a routing table, and may forward data between node functions based on the routing table. Additionally or alternatively, a routing function or a routing table may be used to forward data between different access nodes 105.

In some examples, a large-scale or network-wide time division multiplexed (TDM) schedule (e.g., a super schedule) may be used to assign resources to the various access nodes 105 within in a coordinated manner. For example, adjacent stars (e.g., different stars with leaves that share at least one node) or overlapping stars (e.g., stars with one common leaves) may use different wireless resources. At the same time, disjoint stars (e.g., stars that are neither adjacent nor overlapping) may reuse the same wireless resources. The schedule may be followed by all participating wireless nodes through a mutual time synchronization and the frame structure, which may be defined by the RAT.

Figure 4:
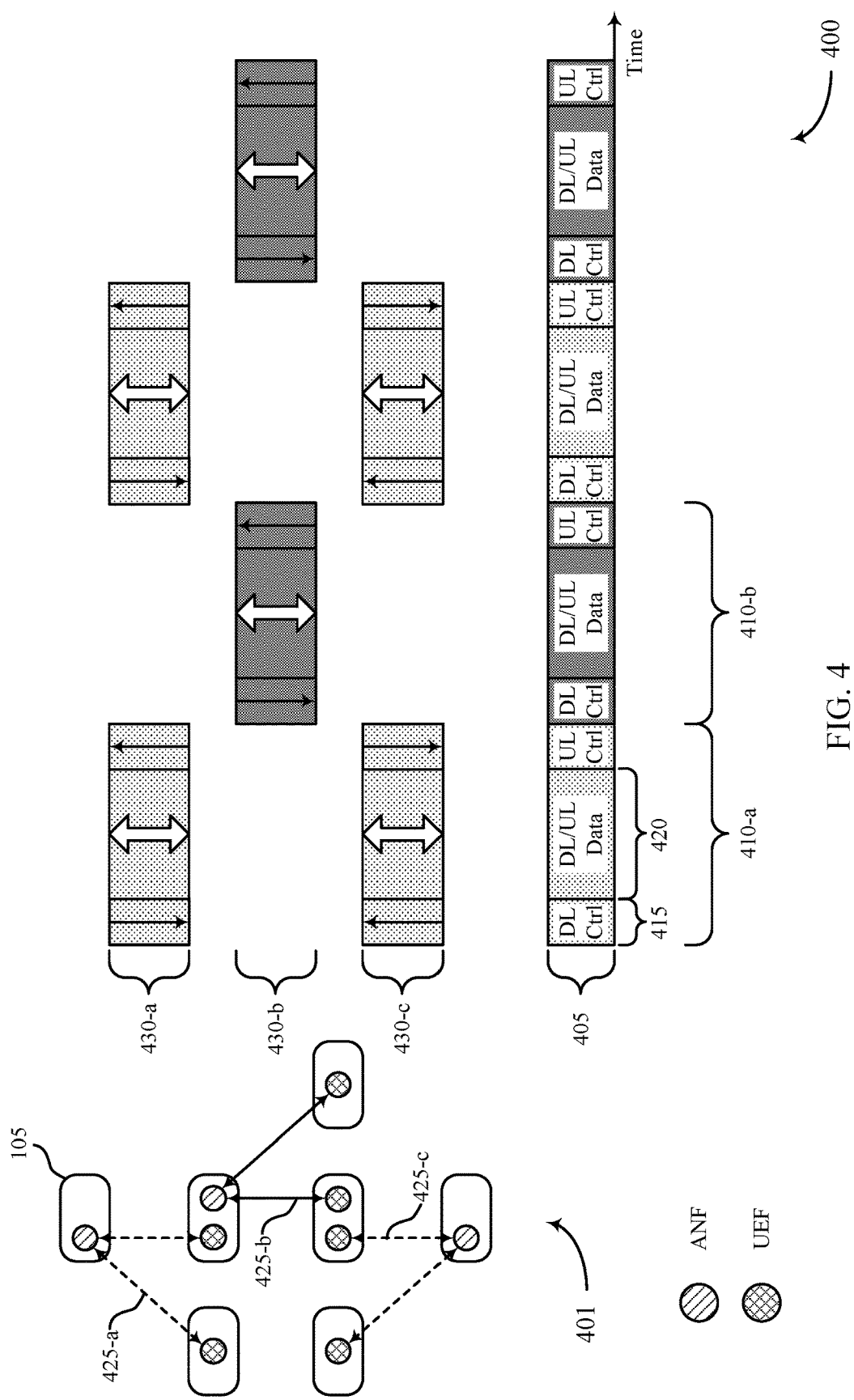
FIG. 4 illustrates an example of a schedule that supports dynamic resource allocation in a wireless network in accordance with aspects of the present disclosure.

FIG. 4 illustrates an example of a schedule 400 for dynamic resource allocation in a wireless network. Schedule 400 may illustrate an example of time-multiplexing wireless resources for multiple access nodes that form a mesh topology. For example, schedule 400 may illustrate a schedule used by a backhaul network 401 that comprises seven access nodes 105 that form three different stars. In some examples, the backhaul network 401 includes both wireless and wired communication links.

Schedule 400 may be aligned to a synchronized and slotted frame structure for uplink and downlink transmissions. For example, a frame structure 405 may be supported by a RAT (e.g., a mmW RAT) and be used to coordinate signaling and resource allocation in a wireless backhaul network, such as backhaul network 200 or backhaul network 300 as described with reference to FIGS. 2 and 3, or backhaul network 401. Within frame structure 405, a frame may occupy a time slot 410, and each frame may include control portions 415 (e.g., a portion that includes downlink control and a portion that includes uplink control at the beginning and end of the frame, respectively) and a data portion 420 (e.g., a portion that is used for the transmission of uplink and downlink data). For instance, each time slot 410 may include a downlink control channel in a first sub-slot, a downlink or uplink data channel in a second sub-slot, and an uplink control channel in a third sub-slot. In some examples, a time slot 410 may represent a frame or a subframe. In the example of the schedule 400, downlink data and control may be transmitted between an ANF and a UEF, and uplink data and control may be transmitted between a UEF and an ANF.

In some examples, the schedule 400 may be based on a network topology (e.g., the topology of the backhaul network 401), where the schedule 400 divides resources into multiple groups (e.g., respective groups for ANF and UEFs). The schedule 400 may assign alternating time slots 410 to these resources, where a first time slot 410-*a* is associated with a first set of wireless resources and a second time slot 410-*b* is associated with a second set of wireless resources.

An access node 105 within backhaul network 401 may communicate with one or more other access node 105 using one or more node functions, such as an ANF and a UEF, as described with reference to FIGS. 2 and 3. Accordingly, communication may take place between a first access node 105 using an ANF and one or more access nodes 105 using a UEF over communication links 225-*a*. Similarly, a second access node 105 and a third access node 105 using an ANF may respectively communicate with one or more other access nodes 105 over communication links 425-*b* and 425-*c*. In some examples, the communication links 425 may be associated with respective sets of resources. That is, communication links 425-*a* and communication links 425-*c* may use the first set of wireless resources and communication link 425-*b* may use the second set of wireless resources. The access nodes 105 may be examples of the access nodes 105 described in reference to FIGS. 1, 2 and/or 3.

A node function may operate according to an active mode and a suspended mode based on schedule 400. That is, a node function may be active or suspended in respective time slots 410 according to a resource schedule 430. As an example, access nodes 105 using communication links 425-*a* and 425-*c* (and using the same set of resources) may communicate using resource schedule 430-*a* and resource schedule 430-*c*, respectively. In such cases, the access nodes 105 may communicate using control portions 415 and data portions 420 in the first time slot 410-*a* during an ANF active mode, and may refrain from transmitting during the second time slot 410-*b* during an ANF suspended mode. Further, an ANF at an access node 105 using communication links 425-*b* may refrain from communicating during the first time slot 410-*a*, but communicate according to resource schedule 430-*b* during an ANF active mode in second time slot 410-*b*.

In some cases, an ANF may use every resource schedule 430 for designated time slots 410 for communication between the UEFs that the ANF controls. In some cases, within each resource allocation established by the schedule 400, each ANF may schedule resources among one or more UEFs, and an access node 105 may further sub-schedule resources among multiple UEs 115 (not shown). In some examples, other resource allocation schemes for the schedule may be possible. That is, more time slots 410 may be allocated to a wireless resource than for another wireless resource. Additionally or alternatively, a greater number of resources may be scheduled based on a network topology.

Figure 5:
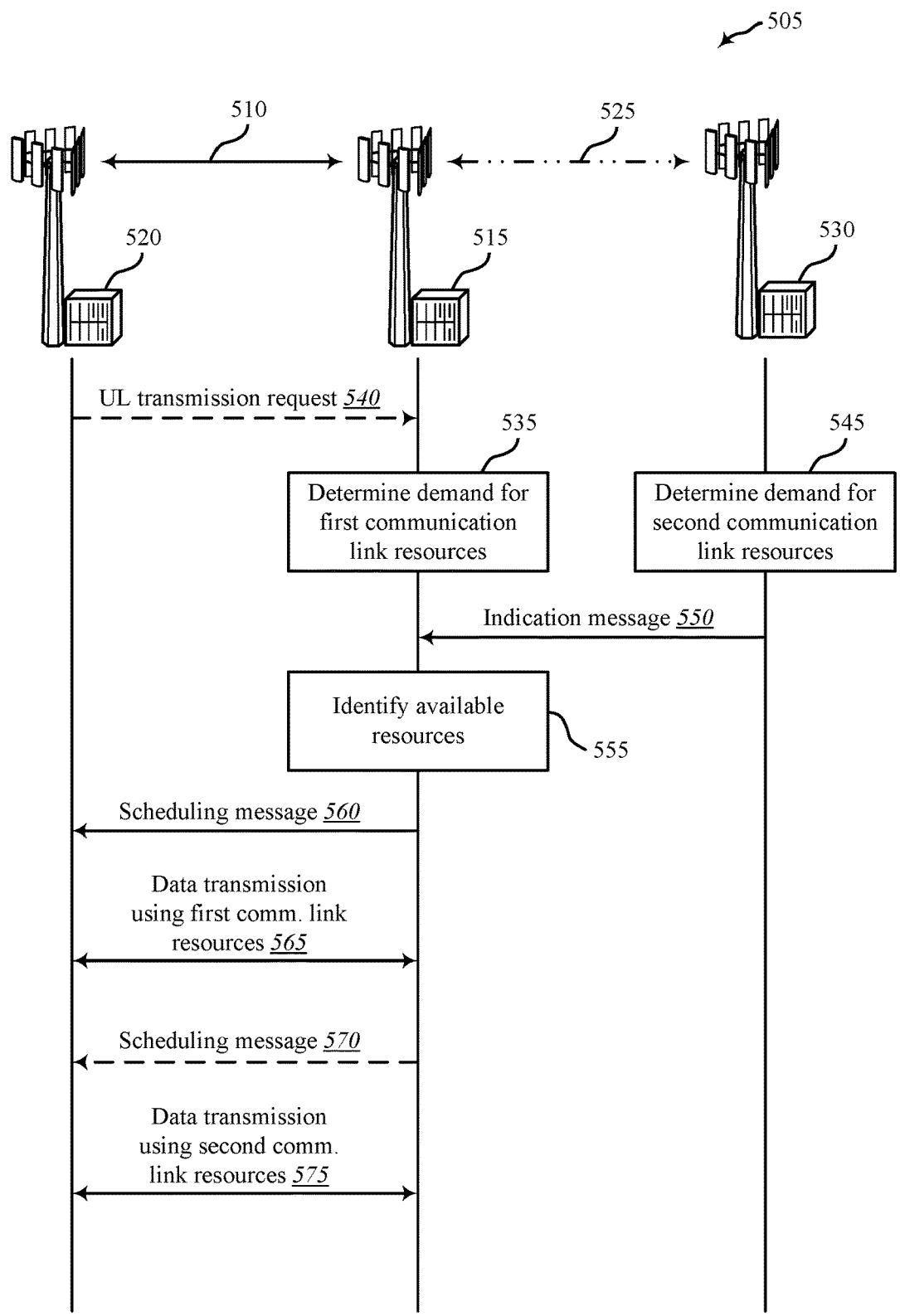
FIG. 5 illustrates an example of a communication swim diagram that supports dynamic resource allocation in a wireless network in accordance with aspects of the present disclosure.

FIG. 5 illustrates an example of a communication swim diagram 500 for dynamic resource allocation in a wireless network. The diagram 500 shows communications for a communications network 505. In some examples, the communications network 505 may be a wireless backhaul network. The communications network 505 includes a first communication link 510 established between a first access node 515 and a second access node 520 and a second communication link 525 established between the first access node 515 and a third access node 530. In some examples, the access nodes 515, 520, 530 may be embodied as access nodes 105 or base stations for a 5G or LTE access network.

Resources of the communications network 505 may be allocated to the first communication link 510 and the second communication link 525 according to the schedule 400. In some examples, the schedule 400 may be the synchronized frame structure 800 or the synchronized frame structure 900 described with reference to FIGS. 8 and 9. The resources defined by the schedule 400 may be time slots, time intervals, frequency bands, codes, antenna beams, antenna ports, or any combination thereof. In the illustrative example, the schedule 400 assigns time intervals to each communication link such that a first subset of resources are dedicated to the first communication link 510 and a second subset of resources are dedicated to the second communication link 525. In other examples, when there are additional communication links, the synchronized subframe may define additional subsets of resources.

The access node 515 may implement an access node function for the first communication link 510 that allows the access node 515 to schedule transmissions on the first communication link 510. The access node 520 may implement a user equipment function for the first communication link 510 that allows the access node 520 to communicate via the first communication link 510. However, the UEF implemented by the access node 520 may request that the access node 520 receive permission from the corresponding ANF (i.e., access node 515) of the first communication link 510 before transmitting on the first communication link 510. Similarly, the access node 530 may implement an ANF for the second communication link 525 and the access node 515 may implement a UEF for the second communication link 525. In this manner, the access node 515 may be able to communicate via both the first communication link 510 and the second communication link 525.

The swim diagram 500 illustrates an example of occupancy/availability signaling between access nodes 515, 520, 530. The occupancy/availability signaling may be used to dynamically allocate local resources between the access nodes. The swim diagram 500 is presented for illustrative purposes of the basic principles of occupancy/availability signaling.

At block 535, the access node 515 may determine a demand for the resources, or scheduled resources, dedicated to the first communication link 510. The access node 515 may predict a pending need for a particular resources, such as time slots defined by the schedule 400 that are dedicated to the first communication link 510. The determination of demand may include link quality measurements to gauge the channel conditions and the corresponding transmission rate. The determination of demand may also be based on queuing load, for instance. The access node 515 may evaluate these properties on one single link or on multiple links (e.g. if the ANF multiplexes its resource over these multiple links). This evaluation may include measurements of DL link quality and load and UL link quality and load. The UL load may, for instance, be signaled to the ANF via UL transmission requests 540 (e.g., scheduling requests). In some examples, the access node 515 may use machine learning, past historical data, or other more global data to estimate demand for resources on the first communication link 510.

Based on the determination of demand, the access node 515 may also determine whether one or more resources dedicated to the first communication link 510 are occupied or available at a future time. For example, the access node 515 may determine that based on requests for transmissions by either the access node 515 or the access node 520 the dedicated resources of the first communication link 510 are occupied for the foreseeable future. In other examples, the access node 515 may determine that at least some of the resources dedicated to the first communication link 510 at certain time intervals in the future.

At block 545, the access node 530 may determine the demand for resources dedicated to the second communication link 525. It should also be noted that the access node 515 may send UL transmission requests 540 to the access node 530. If such is the case, the access node 530 would determine that the resources dedicated to the second communication link 525 are occupied. However, if the resources of the second communication link 525 are unoccupied, or are available, the access node 530 may release its available resources to other neighboring communication links and neighboring access nodes (e.g., first communication link 510). It should be appreciated that the determinations for demand of resources dedicated to the first communication link 510 and the second communication link 525 are performed by the communication link's respective ANF. In the illustrative example, the ANF for the first communication link 510 is access node 515 and the ANF for the second communication link 525 is access node 530.

Based upon determining that at least some resources dedicated to the second communication link 525 are available for use by neighboring communication links, the access node 530 may generate an indication message 550 and send that indication message 550 to neighboring access nodes (e.g., access node 515). In some examples, the indication message 550 is sent when one state is determined to be true (e.g., if the resources are available). In such examples, a non-receipt of an indication message 550 may indicate that the other state is true (e.g., if the resources are occupied). In this way, a receiver may derive information from the reception as well as the absence of reception of the indication message 550. In the illustrative example, the indication message 550 indicates that resources are available. However, in other examples, the indication message 550 may indicate that resources are occupied. In some examples, a neighboring access node may conclude that a resource is available if no indication message is received, which is sent to flag occupancy.

The communication links and the access nodes that receive the indication message 550 about the available resources of the second communication link 525 may depend on the local network topology and resource allocation. Additional examples of more complex network topologies are shown in FIG. 3. The indication message 550 may be sent on different links at different times. The indication message 550 may include additional information about the available resources. Such additional information may include, what type of resources are available/occupied (e.g., time slots, frequencies, etc.), when the resources are available/occupied (e.g., at the next time interval or at a time interval several slots in the future), whether a fraction of the resource is available/occupied, other resource specific information, or any combination thereof. A neighboring ANF may listen for indication messages during the control portions 415 of selected communication links. For example, the access node 515 may listen for the indication message 550 during the control portions 415 of scheduled resource of the second communication link 525.

At block 555, the access node 515 (e.g., the neighboring ANF) may determine that it has received an indication message 550 from the first communication link 510. The access node 515 may then process the indication message 550, determine what information it includes, and identify what resources are available to be used by the access node 515. If the first communication link 510 has a demand for resources that exceeds its dedicated resources, the access node 515 may determine to use the available resources of the second communication link 525 to send additional data traffic across the first communication link 510.

The access node 515 may transmit a scheduling message 560 to the relevant access nodes running UEFs for the first communication link 510. The scheduling message 560 may indicate which entity using the first communication link 510 (e.g., access node 515 or access node 520) has permission to transmit using a particular scheduled resource. The scheduling message 560 may be transmitted during the control portion 415 of the scheduled resource dedicated to the first communication link 510. In some examples, the scheduling message 560 only indicates how one scheduled resource should be used. For example, the scheduling message 560 may indicate how the next resource dedicated to the first communication link 510 is to be used. In other examples, the scheduling message 560 may be used to indicate how multiple scheduled resources are to be used. For example, the scheduling message 560 may indicate how a first scheduled resource dedicated to the first communication link 510 is to be used and how a subsequent second scheduled resource dedicated to the second communication link 525 is also to be used.

At message 565, data may be communicated via the first communication link 510 based upon the scheduling message 560. The data may be transmitted by either the access node 515 or the access node 520. The data may be transmitted during the data portion 420 of the scheduled resource.

Figure 8:
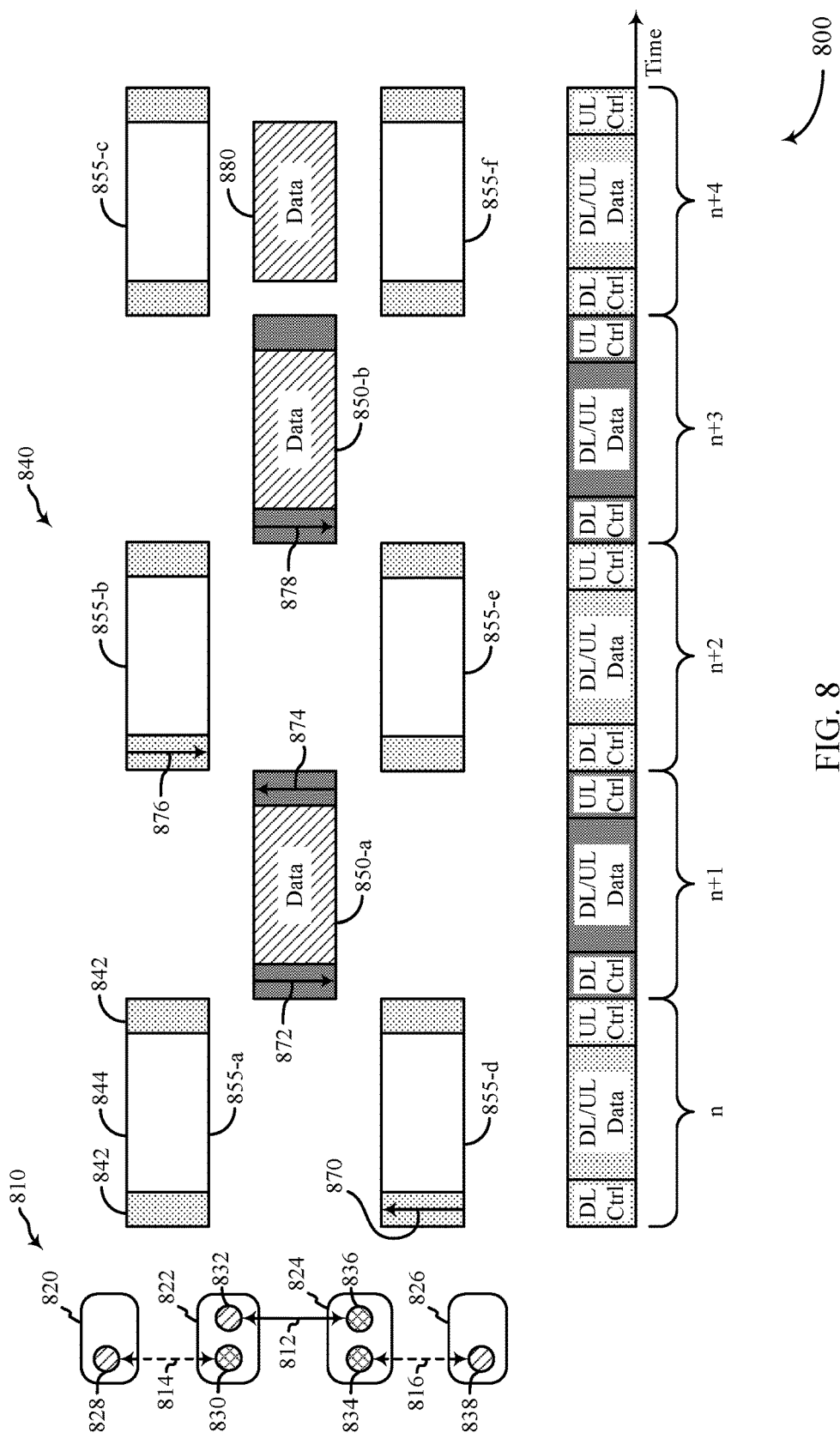
FIG. 8 illustrates an example of resource allocation in a synchronized frame structure that supports dynamic resource allocation in a wireless network in accordance with aspects of the present disclosure.
Figure 9:
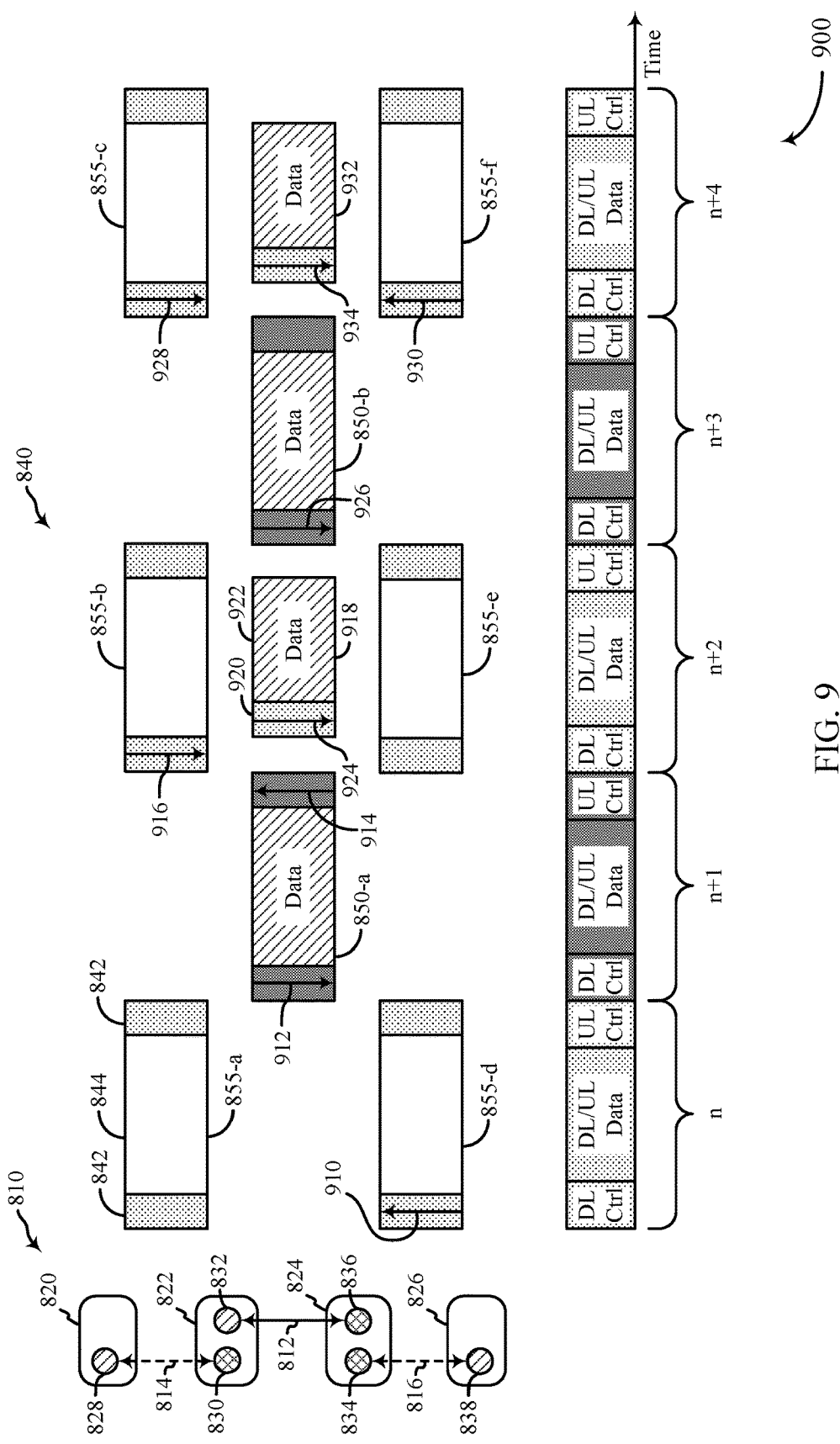
FIG. 9 illustrates another example of resource allocation in a synchronized frame structure that supports dynamic resource allocation in a wireless network in accordance with aspects of the present disclosure.

A scheduling message 570 may sent prior to communicating data using a scheduled resource dedicated to the second communication link 525 but made available by the ANF of the second communication link 525. The scheduling message 570 may be similarly embodied as the scheduling message 560. In some examples, the scheduling message 570 is not transmitted because the scheduling message 560 includes the information to schedule the newly available resources dedicated to the second communication link 525 as shown in FIG. 8. In some examples, the scheduling message 570 may be transmitted during the data portion of the resources dedicated to second communication link 525 as shown in FIG. 9. In such a manner, the control portions 415 of the resources dedicated to the second communication link 525 are still preserved to network purposes. For example, even though the second communication link 525 data resources are available for other communication links to use, indication messages may still be transmitted across the second communication link 525 during a particular time interval or time slot.

At message 575, data may be communicated via the first communication link 510 using the resources made available by the ANF of the second communication link 525. Generally, the schedule 400 would not permit the first communication link 510 to transmit using these resources, except that the resources have been released by the relevant ANF (e.g., access node 530 running the ANF). The data may be transmitted by either the access node 515 or the access node 520. The data may be transmitted during the data portion 420 of the scheduled resource.

While the swim diagram 500 shows communications across the communication links 510, 525 and three access nodes 515, 520, 530, the methods described herein may be expanded to include additional communication links and additional access nodes.

The access nodes 515, 520, 530 may be examples of access nodes 105 described with reference to FIGS. 1-4. The ANFs may be examples of the ANFs described with reference to FIGS. 2-4. The UEFs may be examples of the UEFs described with reference to FIGS. 2-4. The communication links 510, 525 may be examples of the communication links described with reference to FIGS. 2-4.

Figure 6A:
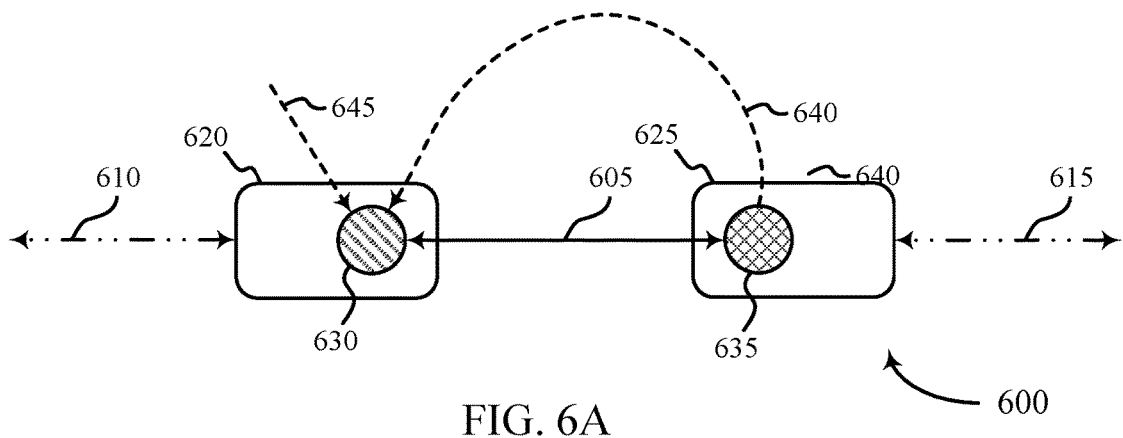
FIGS. 6A-6C illustrate examples of network connection diagrams that support dynamic resource allocation in a wireless network in accordance with aspects of the present disclosure.
Figure 6B:
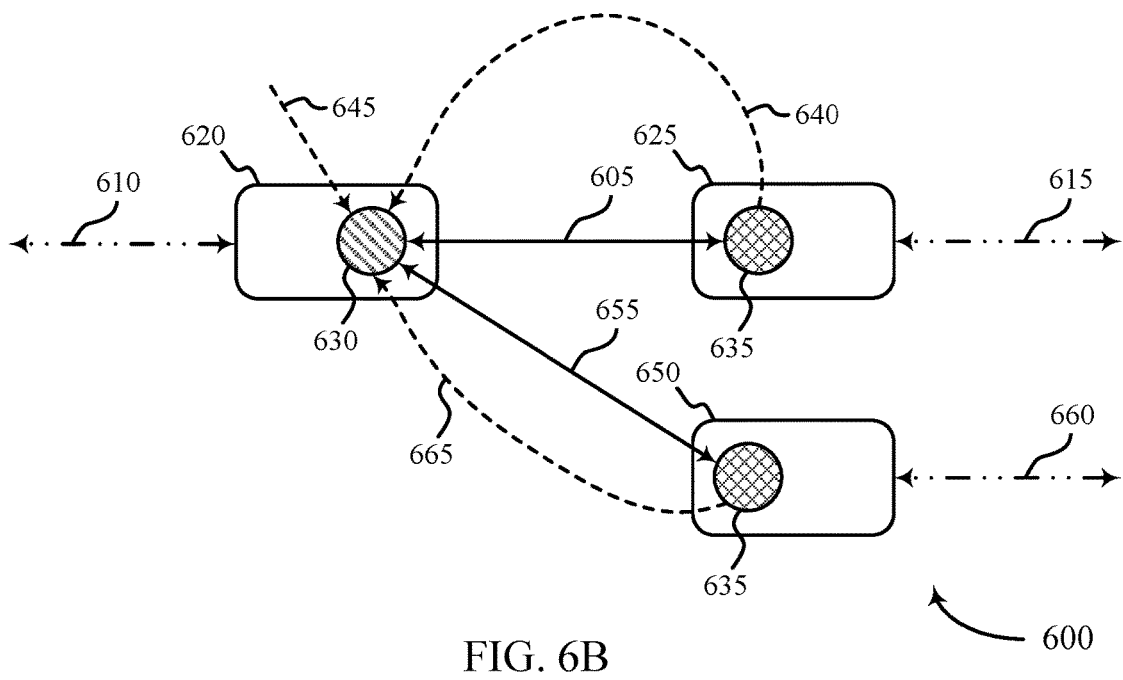
Figure 6C:
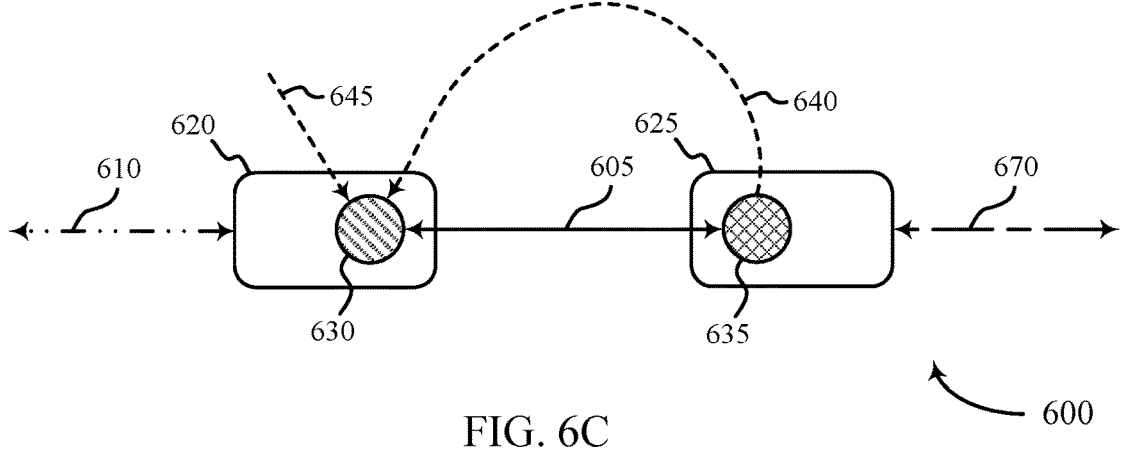

FIGS. 6A-6C illustrate examples of network connection diagrams of a communications network 600 for dynamic resource allocation in a wireless network. FIGS. 6A-6C illustrate examples of occupancy/availability signaling as it occurs in different network topologies.

FIG. 6A shows a local network topology for a communications network 600. The communications network 600 may be a wireless backhaul network. The communications network 600 includes a primary communication link 605, a first auxiliary communication link 610, and a second auxiliary communication link 615. The communication links 605, 610, 615 may be similar to the other communication links discussed above (e.g., communication links 510, 525). The primary communication link 605 may be assigned a first subset of resources by the schedule 400. The auxiliary communication links 610, 615 may be assigned a second subset of resources by the schedule 400. The auxiliary communication links 610, 615 may utilize the same subset of resources because they may be separated enough spatially that they will not interfere with one another.

An access node 620 may communicate with an access node 625 via the primary communication link 605. In addition, the access node 620 may communication with other access nodes via the first auxiliary communication link 610 and the access node 625 may communicate with other access nodes via the second auxiliary communication link 615. In the illustrative example, the access node 620 implements an ANF 630 for the primary communication link 605 and the access node 625 implements a UEF 635 for the primary communication link 605. In other examples, however, the functions of the access nodes 620, 625 may be reversed. As used in this disclosure, the terms primary and auxiliary are not meant to denote differences in technical features, importance, priority but to denote that different resources are dedicated for each link by the resource plan (e.g., schedule 400).

The ANF 630 of the primary communication link 605 (e.g., access node 620) may receive a first indication message 640 regarding the occupancy/availability of resources on the first auxiliary communication link 610 and a second indication message 645 regarding the occupancy/availability of resources on the second auxiliary communication link 615. Due to high resource demand, the ANF 630 may wish to also use resources from its adjacent links (e.g., links 610, 615). If both of the indication messages 640, 645 indicate that both the resources of both neighboring communication links (e.g., links 610, 615) are available during a particular time interval, the ANF 630 may then utilize the available resource of the auxiliary communication links for its own traffic.

FIG. 6B shows a similar local network topology for the communications network 600 as shown in FIG. 6A, except an additional access node 650 is added to the communications network 600. The access node 650 is coupled to the access node 620 via a second primary communication link 655. The second primary communication link 655 utilizes the same subset of resources defined by the schedule 400 as the first primary communication link 605. The access node 650 may be coupled to other access nodes via a third auxiliary communication link 660, which uses the same subset of resources defined by the schedule 400 as the other auxiliary communication links 610, 615. The access node 650 may implement a UEF 635 for the second primary communication link 655. The access node 650 may transmit a third indication message 665 regarding the occupancy/availability of resources for the third auxiliary communication link 660 to the ANF 630.

Before using any resources dedicated to any of the auxiliary communication links 610, 615, 660, the ANF 630 (e.g., access node 620) may determine whether each of the auxiliary communication links 610, 615, 660 are available. For example, before transmitting via the second primary communication link 655, the ANF 630 may determine whether all auxiliary communication links 610, 615, 660 have made resources available to the ANF 630 during the particular time interval. In some examples, however, to transmit using the second primary communication link 655, resources from the first auxiliary communication link 610 and the third auxiliary communication link 660 are made available. In some instances of these examples, no other resources are made available. In some examples, to transmit using the first primary communication link 605, resources from the first auxiliary communication link 610 and the second auxiliary communication link 615 are made available. In some instances of these examples, no other resources are made available.

FIG. 6C shows a similar local network topology for the communications network 600 as shown in FIG. 6A, except that the access node 625 is coupled to other access nodes via a tertiary communication link 670 instead of the second auxiliary communication link 615. The tertiary communication link 670 may utilize a third subset of resources defined by the schedule 400 different from the first subset and the second subset of resources utilized by the primary communication links 605, 655 and the auxiliary communication links 610, 615, 660 respectively.

The ANF 630 may utilize the resources of the auxiliary communication link 610 or the tertiary communication link 670 based at least in part on their respective occupancy/availability. For example, if the first indication message 640 indicates that resources dedicated to the auxiliary communication link 610 are available, the ANF 630 may decide to transmit data across the primary communication link 605 using those resources. In another example, if the second indication message 645 indicates that resources dedicated to the tertiary communication link 670 are available, the ANF 630 may decide to transmit data across the primary communication link 605 using those resources.

It should be appreciated that different network topologies may include any combination of the topologies discussed above. For example, a network topology may include four different communication links using four different subsets of resources. In other examples, each communication link may have any number of connections that an ANF may check before utilizing resources not dedicated to a particular communication link.

The access nodes 620, 625, 650 may be examples of access nodes 105 described with reference to FIGS. 1-5. The ANF 630 may be examples of the ANFs described with reference to FIGS. 2-5. The UEF 635 may be examples of the UEFs described with reference to FIGS. 2-5. The communication links 605, 610, 615, 660, 670 may be examples of the communication links described with reference to FIGS. 2-5.

Figure 7A:
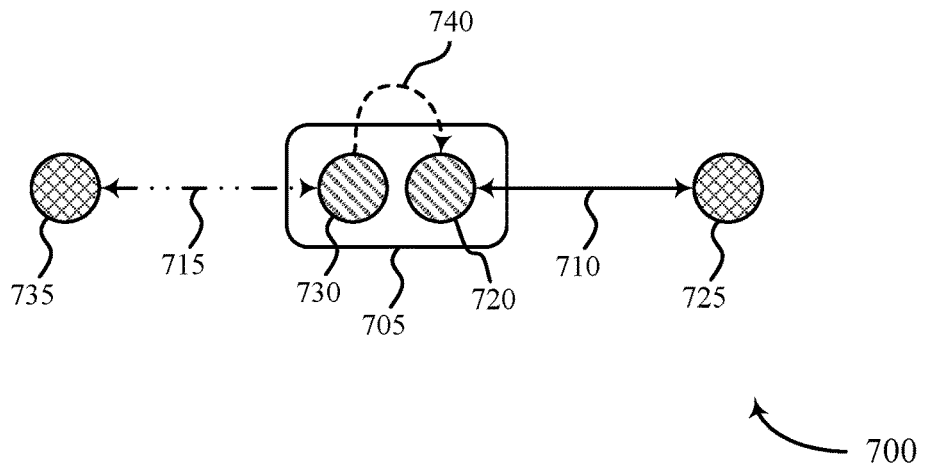
FIGS. 7A-7C illustrate examples of indication message transmission diagrams that support dynamic resource allocation in a wireless network in accordance with aspects of the present disclosure.
Figure 7B:
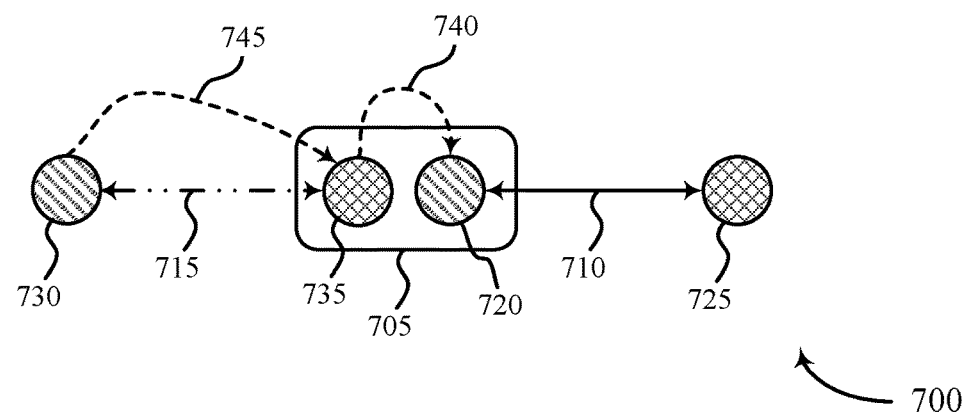
Figure 7C:
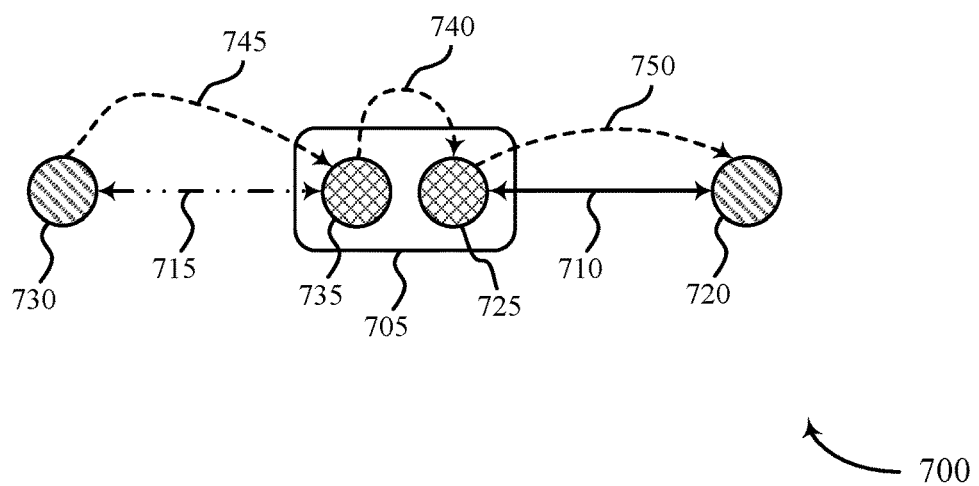

FIGS. 7A-7C illustrate examples of indication message transmission diagrams for dynamic resource allocation in a wireless network 700. Depending on the network topology of the wireless network 700, indication messages may be forwarded, transmitted, and/or relied in different ways. FIGS. 7A-7C are intended to demonstrate basic principles of indication message travel and communication. Various network topologies may deviate from these principle are may use any combination of these principles.

FIG. 7A illustrates a network topology that includes an access node 705 coupled with other access nodes via a first communication link 710 and a second communication link 715. The communication links 710, 715 utilize different subsets of resources defined by the schedule 400. In the illustrative example of FIG. 7A, the access node 705 implements an ANF 720 for the first communication link 710 and implements an ANF 725 for a second communication link 715. The ANFs communicate with associated UEFs 730, 735. The UEFs 730, 735 may be implemented by other access nodes that are not depicted here.

It may be determined that resources dedicated to the second communication link 715 are available to be used by other communication links. For example, the ANF 725 of the second communication link 715 may determine that certain resources of the second communication link 715 may be available for a certain time interval. Because both the ANF 720 of the first communication link 710 and the ANF 725 of the second communication link 715 are implemented on the access node 705, the ANF 725 may send an indication message 740 directly to the ANF 720 internal to the access node 705. In such a situation, no signaling across the wireless network may be performed.

FIG. 7B illustrates a similar network topology to that shown in FIG. 7A except that the access node 705 implements the UEF 735 of the second communication link 715 instead of the ANF 725 of the second communication link 715. In order to make resources dedicated to the second communication link 715 available to the first communication link 710, two indication messages may be used. The ANF 725 may first determine that certain resources are available to be used by other communication links. At which time, the ANF 725 may generate and transmit an indication message 745 to its related UEFs being implemented by neighboring access nodes (e.g., access node 705). Once the UEF 735 receives the indication message 745, the UEF 735 may generate the intra-access node indication message 740 and send it to the ANF 720 for the first communication link 710. In this manner, indication messages may be received by ANFs of the relevant communication links.

FIG. 7C illustrates a similar network topology to that shown in FIG. 7B except that the access node 705 implements the UEF 730 of the first communication link 710 instead of the ANF 720 of the first communication link 710. In order to make resources dedicated to the second communication link 715 available to the first communication link 710, three indication messages may be used. The ANF 725 may determine that certain resources are available to be used by other communication links. At which time, the ANF 725 may generate and transmit the indication message 745 to its related UEFs being implemented by neighboring access nodes (e.g., access node 705). Once the UEF 735 receives the indication message 745, the UEF 735 may generate the intra-access node indication message 740 and send it to the UEF 730 for the first communication link 710. The UEF 730 may then generate another indication message 750 to transmit via the first communication link 710 to the ANF 720. In this manner, the access node 705 becomes effectively a pass-through entity for the indication messages between the ANFs 720, 725 of the first communication link 710 and the second communication link 715. Upon receiving the indication message 745, the access node 705 may forward the indication message 745 as indication message 750 to the appropriate ANF (e.g., ANF 720). In this manner, an access node 705 may forward indication messages to other access nodes.

The access node 705 may be an example of access nodes 105 described with reference to FIGS. 1-6. The ANFs 720, 725 may be examples of the ANFs described with reference to FIGS. 2-6. The UEFs 730, 735 may be examples of the UEFs described with reference to FIGS. 2-6. The communication links 710, 715 may be examples of the communication links described with reference to FIGS. 2-6.

FIG. 8 illustrates an example of a resource allocation in a synchronized frame structure 800 for dynamic resource allocation in a wireless network. The resource allocation scheme shown FIG. 8 illustrates how resources can be shifted among nodes within a synchronized frame structure 800. A communications network 810 may include a chain of three communication links. The communications network 810 may be a wireless backhaul network. The synchronized frame structure 800 may be an example of the schedule 400.

The communications network 810 includes a primary communication link 812, a first auxiliary communication link 814, and a second auxiliary communication link 816. The communications network 810 includes four access nodes, a first access node 820, a second access node 822, a third access node 824, and a fourth access node 826. The first access node 820 may implement an ANF 828 for the first auxiliary communication link 814. The second access node 822 may implement a UEF 830 for the first auxiliary communication link 814 and an ANF 832 for the primary communication link 812. The third access node 824 may implement a UEF 834 for the primary communication link 812 and a UEF 836 for the second auxiliary communication link 816. The fourth access node 826 may implement an ANF 838 for the second auxiliary communication link 816.

The access nodes 820, 822, 824, 826 may be examples of access nodes 105 described with reference to FIGS. 1-7. The ANFs 828, 832, 838 may be examples of the ANFs described with reference to FIGS. 2-7. The UEFs 830, 834, 836 may be examples of the UEFs described with reference to FIGS. 2-7. The communication links 812, 814, 816 may be examples of the communication links described with reference to FIGS. 2-7.

The synchronized frame structure 800 may include a number of resources 840 that include a control portion 842 and a data portion 844. In some examples, a resource 840 includes two control portions 842, a downlink control portion (or a DL control channel) and an uplink control portion (or a UL control channel). In the illustrative example, the resources 840 are embodied as frames spanning a unique time interval. A first subset 850 of resources 840 are dedicated for the primary communication link 812. A second subset 855 of resources 840 are dedicated for the auxiliary communication links 814, 816. For example, the first subset 850 includes resources at time intervals n+1, n+3, etc., and the second subset 855 includes resources at time intervals n, n+2, n+4, etc. In other examples, the synchronized frame structure 800 may be divided into additional subsets of resources 840 depending on the network topology.

The following disclosure relate to how indication messages may move between access nodes through the communications network 810 over time. At slot n (i.e., the time interval represented by n), the ANF 838 of the second auxiliary communication link 816 may transmit an indication message 860 on a control portion 842 of a resource 855-*d*, which is received by the UEF 836 of the second auxiliary communication link 816 and passed on to the UEF 834 of the primary communication link 812. The indication message 860 may include information indicating that the resource 855-*f* (at time interval n+4) is available for the second auxiliary communication link 816. In some examples, the information states that the second auxiliary communication link 816 may be available in four time slots.

At time slot n+1, the ANF 832 of the primary communication link 812 may transmit a scheduling message 872 during a control portion 842 to schedule data for transmission via the primary communication link 812 during this time slot. Also during the time slot n+1, the UEF 834 of the primary communication link 812 may send an indication message 874 to its ANF 832 on the UL control portion of resource 850-*a*. The indication message may include information that resource 855-*f* for the second auxiliary communication link 816 is available.

At time slot n+2, the ANF 828 of the first auxiliary communication link 814 may transmit an indication message 876 on the DL control portion 842 of resource 855-*b* of the first auxiliary communication link 814. The indication message 876 may include information that resource 855-*c* for the first auxiliary communication link 814 is available. The indication message may be received by the UEF 830 for the first auxiliary communication link 814 and passed on to the ANF 832 for the primary communication link 812.

At time slot n+3, the ANF 832 of the primary communication link 812 may transmit a scheduling message 878 to schedule data to be transmitted using resource 850-*b* via the primary communication link 812. In addition, the scheduling message 878 may also schedule data to be transmitted during the time slot n+4 because both resource 855-*c* and resource 855-*f* are not being used by their respective auxiliary communication links 814, 816. The scheduling message may be transmitted during a control portion of the resource 850-*b*.

At time slot n+4, a data message 880 may be transmitted via the primary communication link 812 using resources usually dedicated to the auxiliary communication links 814, 816. The data message 880 may be transmitted during the data portion of resources 855-*c*, 855-*f*, thereby allowing the auxiliary communication links 814, 816 to be used to transmit network messages, such as indication messages for indicating resources that may be available in the future. In some examples, the data message 880 is transmitted exclusively during the data portion.

FIG. 9 illustrates an example of a resource allocation in a synchronized frame structure 900 for dynamic resource allocation in a wireless network. Another example of a resource allocation scheme is shown in FIG. 9. The features of the wireless network 905 and the synchronized frame structure 900 are similarly embodied as those described in FIG. 8 and thus descriptions of those features are not repeated here. It should be appreciated that features having similar or identical numbers may be embodied similarly. The synchronized frame structure 900 may be an example of the schedule 400. In the synchronized frame structure 900, a data message 918 transmitted using resources not dedicated to the relevant communication link may include a control portion 920 and a data portion 922 and a scheduling message 924 may be transmitted during the control portion 920.

At slot n (i.e., the time interval represented by n), the ANF 838 of the second auxiliary communication link 816 may transmit an indication message 910 on a control portion 842 of a resource 855-*d*, which is received by the UEF 836 of the second auxiliary communication link 816 and passed on to the UEF 834 of the primary communication link 812. The indication message 910 may include information indicating that the resource 855-*e* (at time interval n+2) is available for the second auxiliary communication link 816. In some examples, the information states that the second auxiliary communication link 816 may be available in two time slots.

At time slot n+1, the ANF 832 of the primary communication link 812 may transmit a scheduling message 912 during a control portion 842 of resource 850-*a* to schedule data for transmission via the primary communication link 812 during this time slot. Also during the time slot n+1, the UEF 834 of the primary communication link 812 may send an indication message 914 to its ANF 832 on the UL control portion of resource 850-*a*. The indication message 914 may include information that resource 855-*f* for the second auxiliary communication link 816 is available.

At time slot n+2, the ANF 828 of the first auxiliary communication link 814 may transmit an indication message 916 on the DL control portion 842 of resource 855-*b* of the first auxiliary communication link 814. The indication message 916 may include information that resource 855-*b* for the first auxiliary communication link 814 is available at the next time slot. The indication message 916 may be received by the UEF 830 for the first auxiliary communication link 814 and passed on to the ANF 832 for the primary communication link 812.

Upon receiving indication messages 910, 916, the ANF 832 for the primary communication link 812 may determine that it may utilize the resources normally dedicated to the auxiliary communication links 814, 816. As such, the ANF 832 may generate a data message 918 to be sent via the primary communication link 812 during the time slot n+2. The data message 918 may include both a control portion 920 and a data portion 922. The data message 918 is also configured to be transmitted during the data portion 844 of resources 855-*b*, 855-*e*, thereby reserving the control portions 842 of those resources to be used by the auxiliary communication links 814, 816. A scheduling message 924 may be transmitted during the control portion 920 of the data message 918. The scheduling message 924 may be embodied similarly to other scheduling messages (e.g., scheduling message 912) and may schedule data for transmission via the primary communication link during the time slot n+2.

Time slots n+3 and n+4 illustrate another scenario that may occur using the data message 918. At time slot n+3, the ANF 832 of the primary communication link 812 may transmit a scheduling message 926 to schedule data to be transmitted using resource 850-*b* via the primary communication link 812.

At time slot n+4, the ANF 828 of the first auxiliary communication link 814 may transmit an indication message 928 on the DL control portion 842 of resource 855-*c* of the first auxiliary communication link 814. The indication message 928 may include information that resource 855-*c* for the first auxiliary communication link 814 is available at the next time slot. The indication message 928 may be received by the UEF 830 for the first auxiliary communication link 814 and passed on to the ANF 832 for the primary communication link 812. In addition, at time slot n+4, the ANF 838 of the second auxiliary communication link 816 may transmit an indication message 930 on a control portion 842 of a resource 855-*f*, which is received by the UEF 836 of the second auxiliary communication link 816 and passed on to the UEF 834 of the primary communication link 812. The indication message 928 may include information indicating that the resource 855-*f* is available for the second auxiliary communication link 816.

Upon receiving indication messages 928, 930, the ANF 832 for the primary communication link 812 may determine that it may utilize the resources normally dedicated to the auxiliary communication links 814, 816. As such, the ANF 832 may generate a data message 932 to be sent via the primary communication link 812 during the time slot n+4. The data message 932 may be similarly embodied as data message 918. The data message 932 may be also configured to be transmitted during the data portion 844 of resources 855-*c*, 855-*f*, thereby reserving the control portions 842 of those resources to be used by the auxiliary communication links 814, 816. A scheduling message 934 may be transmitted during the control portion 920 of the data message 932.

It should be appreciated from FIGS. 8 and 9 that indication messages may be transmitted on control portions of resources 840. For example, an indication message may be included in a DL control channel or an UL control channel. These control channels may use resources that are pre-allocated by a (network-wide) resource plan (e.g., the synchronized frame structure). Furthermore, resource shifting via availability/occupancy signaling may be restricted to the data portions 844 of resources 840, while control portions 842 of resources 840 are typically reserved for the assigned communication link. This allows a communication link to sustain regular control signaling even if it has released its resource to adjacent links. Resource shifting may apply to time-multiplexed resources or frequency-multiplexed resources. The type of resource that is indicated to be available or occupied may be explicitly included in the indication message. It may also be implicitly derived from information an access node holds about the local network topology (e.g., such as the resource plan and the local connectivity). Such information may be provisioned to the access node or configured via additional signaling channels.

Figure 10:
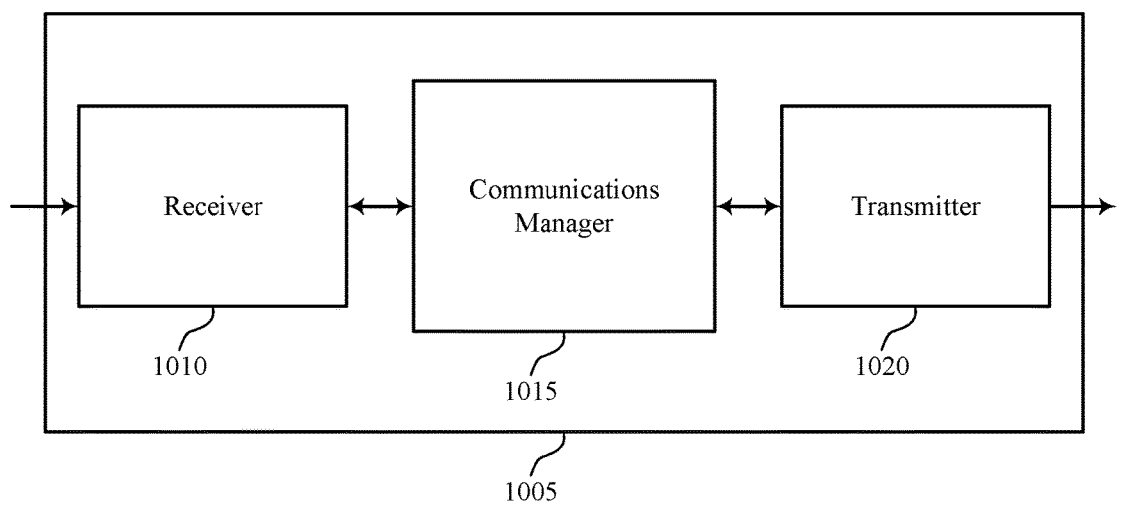
FIGS. 10 through 12 show block diagrams of a device that supports dynamic resource allocation in a wireless network in accordance with aspects of the present disclosure.

FIG. 10 shows a block diagram 1000 of a wireless device 1005 that supports dynamic resource allocation in a wireless network in accordance with various aspects of the present disclosure. Wireless device 1005 may be an example of aspects of an access node 105 as described with reference to FIG. 1. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to dynamic resource allocation in a wireless network, etc.). Information may be passed on to other components of the device. The receiver 1010 may be an example of aspects of the transceiver 1335 described with reference to FIG. 13.

Communications manager 1015 may be an example of aspects of the communications manager 1315 described with reference to FIG. 13.

Communications manager 1015 may determine whether data is available to be transmitted via a first communication link using a radio access technology (RAT) that supports a synchronized frame structure, receive an indication whether a scheduled resource of a second communication link is available during a time interval defined by the synchronized frame structure, and transmit the data via the first communication link using the scheduled resource during the time interval based on the indication indicating that the scheduled resource of the second communication link is available during the time interval.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
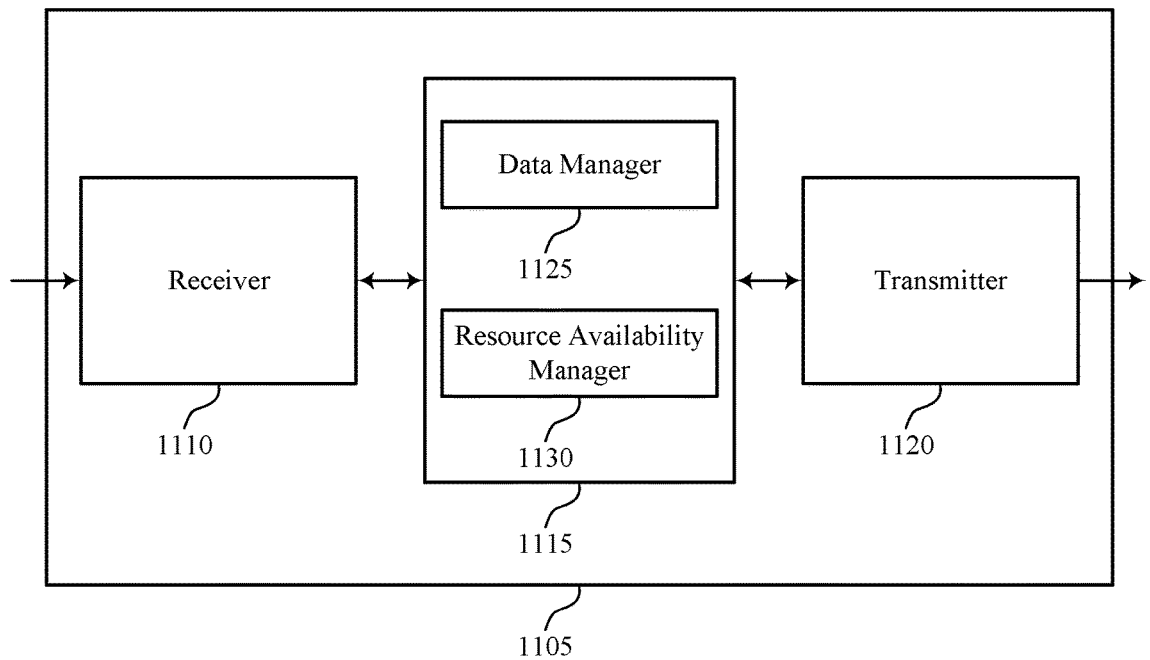

FIG. 11 shows a block diagram 1100 of a wireless device 1105 that supports dynamic resource allocation in a wireless network in accordance with various aspects of the present disclosure. Wireless device 1105 may be an example of aspects of a wireless device 1005 or an access node 105 as described with reference to FIGS. 1 and 10. Wireless device 1105 may include receiver 1110, communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dynamic resource allocation in a wireless network, etc.). Information may be passed on to other components of the device. The receiver 1110 may be an example of aspects of the transceiver 1335 described with reference to FIG. 13.

Communications manager 1115 may be an example of aspects of the communications manager 1315 described with reference to FIG. 13. Communications manager 1115 may also include data manager 1125 and resource availability manager 1130.

Data manager 1125 may determine whether data is available to be transmitted via a first communication link using a RAT that supports a synchronized frame structure, transmit the data via the first communication link during the time interval is further based on the second communication link and the third communication link being available during the time interval, transmit the data via the first communication link during the second time interval based on the third communication link being available during the second time interval, transmit the data via the first communication link using the scheduled resource during the time interval based on the indication indicating that the scheduled resource of the second communication link is available during the time interval, transmit a second indication based on a scheduled resource of the first communication link being available, transmit the data via the first communication link during the time interval further includes: transmitting via the first communication link during the data portion of the scheduled resource of the time interval, and transmit the data during a second portion of the data portion of the scheduled resource of the time interval. In some cases, transmitting the data via the first communication link during the time interval further includes: transmitting uplink control data during a first portion of the data portion of the scheduled resource of the time interval.

Resource availability manager 1130 may receive an indication whether a scheduled resource of a second communication link is available during a time interval defined by the synchronized frame structure, receive a second indication being indicative of whether a schedule resource of a third communication link is available during the time interval, receive a second indication being indicative of whether a scheduled resource of a third communication link is available during a second time interval, forward the indication based on what entity schedules transmissions on the first communication link, determine an availability of a scheduled resource for transmission of data on the first communication link, and transmit, by the first wireless node, a second indication received via the first communication link to the second wireless node via the second communication link. In some cases, a first wireless node receives the indication from a second wireless node. In some cases, the second wireless node transmits the indication if the scheduled resource of the second communication link is available during the time interval. In some cases, the indication includes identifying information about a scheduled resource defined by the synchronized frame structure. In some cases, the indication is transmitted via the control portion.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
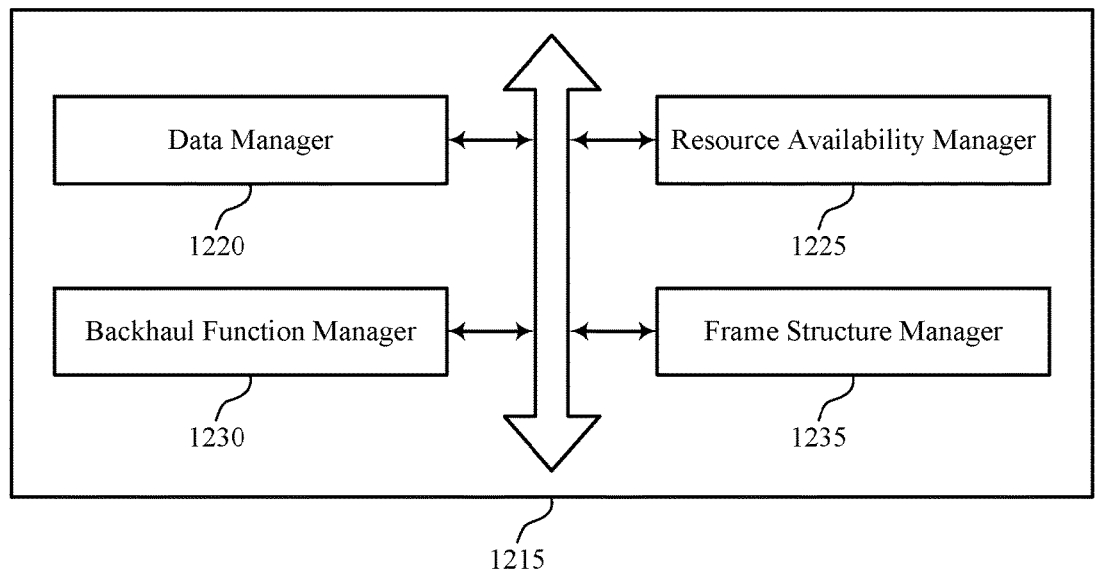

FIG. 12 shows a block diagram 1200 of a communications manager 1215 that supports dynamic resource allocation in a wireless network in accordance with various aspects of the present disclosure. The communications manager 1215 may be an example of aspects of a communications manager 1015, a communications manager 1115, or a communications manager 1315 described with reference to FIGS. 10, 11, and 13. The communications manager 1215 may include data manager 1220, resource availability manager 1225, backhaul function manager 1230, and frame structure manager 1235. Each of these modules may communicate, directly or indirectly, with one another (e.g., via one or more buses).

Data manager 1220 may determine whether data is available to be transmitted via a first communication link using a RAT that supports a synchronized frame structure, transmit the data via the first communication link during the time interval is further based on the second communication link and the third communication link being available during the time interval, transmit the data via the first communication link during the second time interval based on the third communication link being available during the second time interval, transmit the data via the first communication link using the scheduled resource during the time interval based on the indication indicating that the scheduled resource of the second communication link is available during the time interval, transmit a second indication based on a scheduled resource of the first communication link being available, transmit the data via the first communication link during the time interval further includes: transmitting via the first communication link during the data portion of the scheduled resource of the time interval, and transmit the data during a second portion of the data portion of the scheduled resource of the time interval. In some cases, transmitting the data via the first communication link during the time interval further includes: transmitting uplink control data during a first portion of the data portion of the scheduled resource of the time interval.

Resource availability manager 1225 may receive an indication whether a scheduled resource of a second communication link is available during a time interval defined by the synchronized frame structure, receive a second indication being indicative of whether a schedule resource of a third communication link is available during the time interval, receive a second indication being indicative of whether a scheduled resource of a third communication link is available during a second time interval, forward the indication based on what entity schedules transmissions on the first communication link, determine an availability of a scheduled resource for transmission of data on the first communication link, and transmit, by the first wireless node, a second indication received via the first communication link to the second wireless node via the second communication link. In some cases, a first wireless node receives the indication from a second wireless node. In some cases, the second wireless node transmits the indication if the scheduled resource of the second communication link is available during the time interval. In some cases, the indication includes identifying information about a scheduled resource defined by the synchronized frame structure. In some cases, the indication is transmitted via the control portion.

Backhaul function manager 1230 may implement, at the first wireless node, an access node function for the first communication link that allows the first wireless node to schedule transmissions on the first communication link, implement, at the first wireless node, a user equipment function for the second communication link, the UEF allowing the first wireless node to communicate via the second communication link, where the first wireless node implements simultaneously the ANF for the first communication link and a UEF for the second communication link, implement, at the first wireless node, a UEF for the first communication link, and implement, at the first wireless node, a UEF for the second communication link. In some cases, the second wireless node implements an ANF for the second communication link that allows the second wireless node to schedule transmissions on the second communication link. In some cases, one of the first communication link or the second communication link is a wireless backhaul link. In some cases, the RAT includes a millimeter wave RAT.

Frame structure manager 1235 may include information related to the synchronized frame structure. In some cases, the synchronized frame structure is for uplink transmissions and downlink transmissions and defines the scheduled resources, each scheduled resource including a control portion and a data portion. In some cases, a first subset of scheduled resources defined by the synchronized frame structure are assigned to be used by the first communication link and a second subset of scheduled resources defined by the synchronized frame structure are assigned to be used by the second communication link, the first subset being different than the second subset. In some cases, the first subset or the second subset of scheduled resources includes at least one of a time interval, a frequency band, a code, an antenna beam, or a combination thereof.

Figure 13:
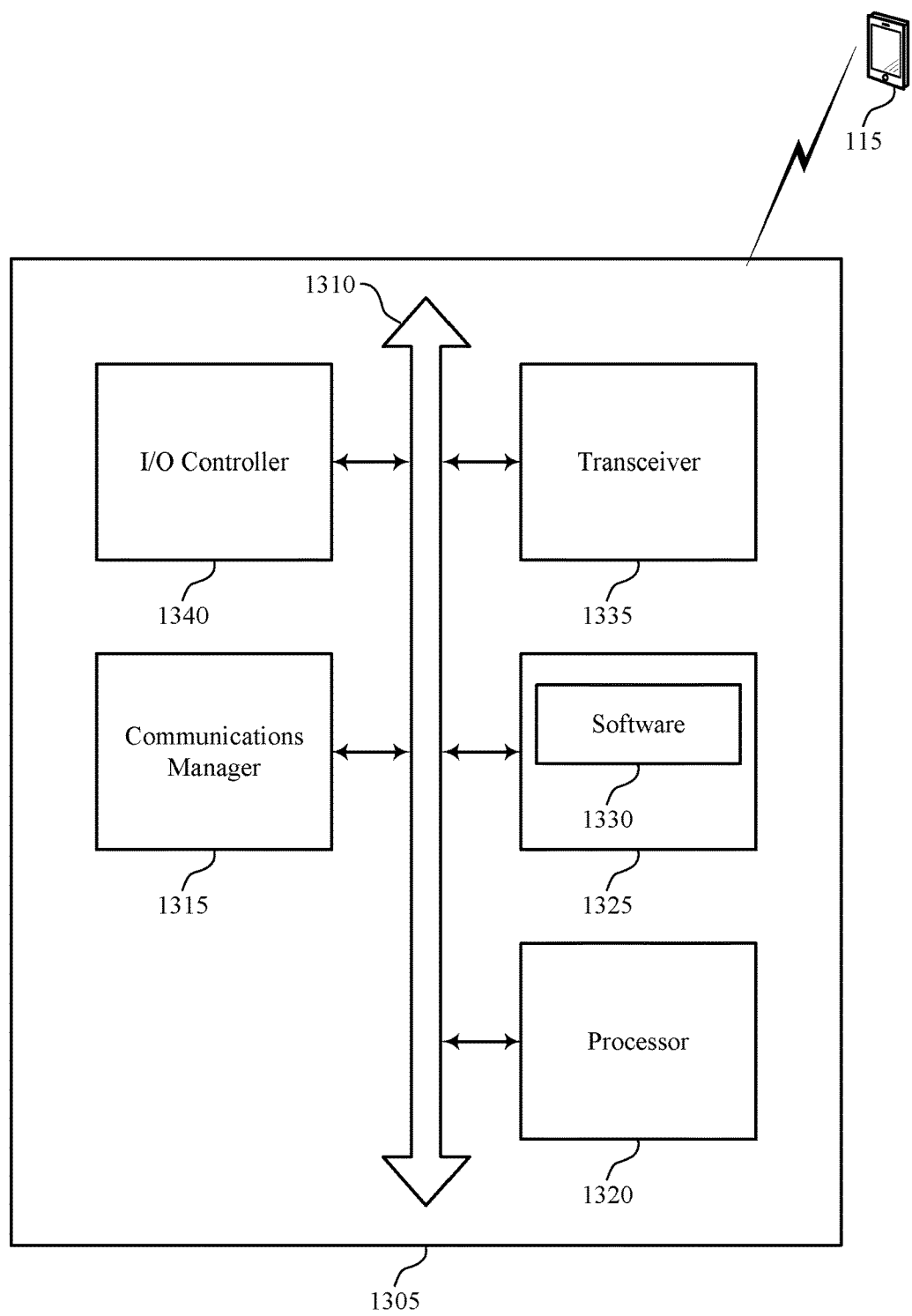
FIG. 13 illustrates a block diagram of a system including an access node that supports dynamic resource allocation in a wireless network in accordance with aspects of the present disclosure.

FIG. 13 shows a diagram of a system 1300 including a device 1305 that supports dynamic resource allocation in a wireless network in accordance with various aspects of the present disclosure. Device 1305 may be an example of or include the components of wireless device 1005, wireless device 1105, or an access node 105 as described above, e.g., with reference to FIGS. 1, 10 and 11. Device 1305 may include components for bi-directional voice and data communications including components for transmitting and receiving communications, including communications manager 1315, processor 1320, memory 1325, software 1330, transceiver 1335, and I/O controller 1340. These components may be in electronic communication via one or more busses (e.g., bus 1310).

Processor 1320 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting dynamic resource allocation in a wireless network). 1320.

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support dynamic resource allocation in a wireless network. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

I/O controller 1340 may manage input and output signals for device 1305. I/O controller 1340 may also manage peripherals not integrated into device 1305. In some cases, I/O controller 1340 may represent a physical connection or port to an external peripheral. In some cases, I/O controller 1340 may utilize an operating system such as iOS®, ANDROID®, MS-DOS®, MS-WINDOWS®, OS/2®, UNIX®, LINUX®, or another known operating system.

Figure 14:
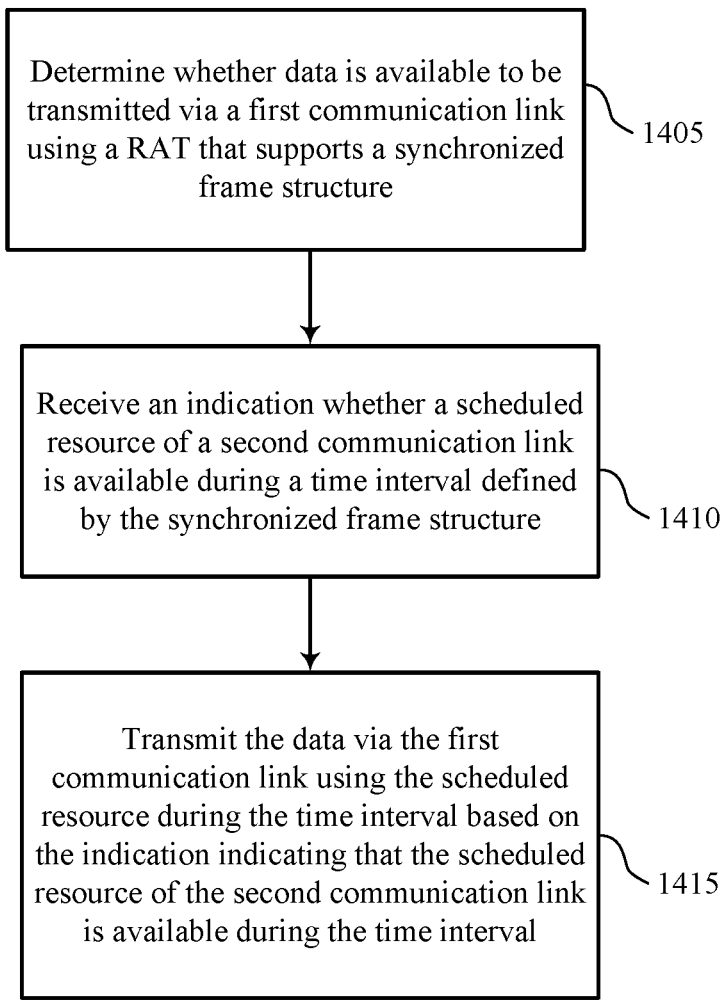
FIGS. 14 through 16 illustrate methods for dynamic resource allocation in a wireless network in accordance with aspects of the present disclosure.

FIG. 14 shows a flowchart illustrating a method 1400 for dynamic resource allocation in a wireless network in accordance with various aspects of the present disclosure. The operations of method 1400 may be implemented by an access node 105 or its components as described herein. For example, the operations of method 1400 may be performed by a communications manager as described with reference to FIGS. 10 through 13. In some examples, an access node 105 may execute a set of codes to control the functional elements of the device to perform the functions described below. Additionally or alternatively, the access node 105 may perform aspects the functions described below using special-purpose hardware.

At block 1405 the access node 105 may determine whether data is available to be transmitted via a first communication link using a radio access technology (RAT) that supports a synchronized frame structure. The operations of block 1405 may be performed according to the methods described with reference to FIGS. 1 through 9. In certain examples, aspects of the operations of block 1405 may be performed by a data manager as described with reference to FIGS. 10 through 13.

At block 1410 the access node 105 may receive an indication whether a scheduled resource of a second communication link is available during a time interval defined by the synchronized frame structure. The operations of block 1410 may be performed according to the methods described with reference to FIGS. 1 through 9. In certain examples, aspects of the operations of block 1410 may be performed by a resource availability manager as described with reference to FIGS. 10 through 13.

At block 1415 the access node 105 may transmit the data via the first communication link using the scheduled resource during the time interval based at least in part on the indication indicating that the scheduled resource of the second communication link is available during the time interval. The operations of block 1415 may be performed according to the methods described with reference to FIGS. 1 through 9. In certain examples, aspects of the operations of block 1415 may be performed by a data manager as described with reference to FIGS. 10 through 13.

Figure 15:
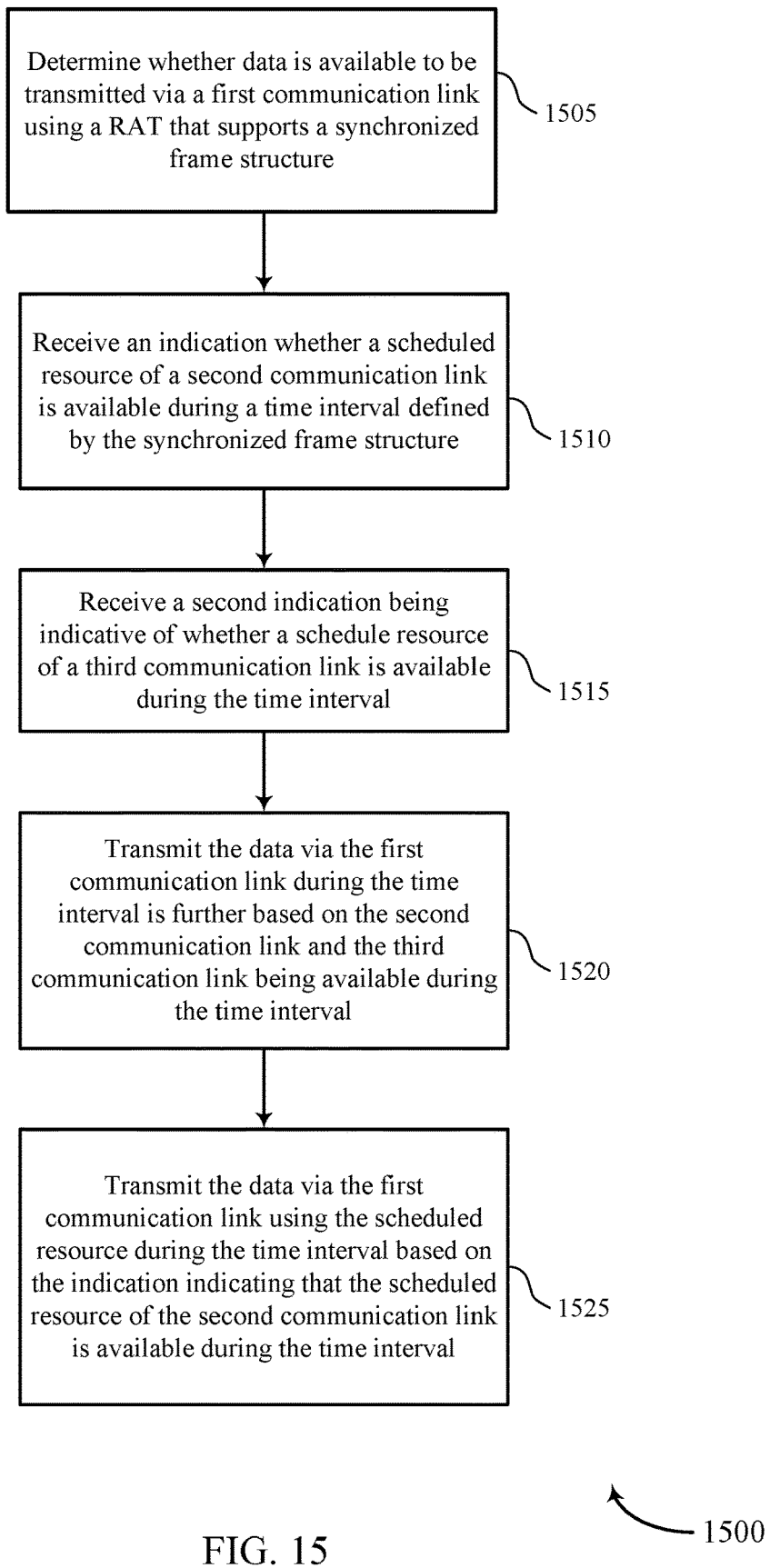

FIG. 15 shows a flowchart illustrating a method 1500 for dynamic resource allocation in a wireless network in accordance with various aspects of the present disclosure. The operations of method 1500 may be implemented by an access node 105 or its components as described herein. For example, the operations of method 1500 may be performed by a communications manager as described with reference to FIGS. 10 through 13. In some examples, an access node 105 may execute a set of codes to control the functional elements of the device to perform the functions described below. Additionally or alternatively, the access node 105 may perform aspects the functions described below using special-purpose hardware.

At block 1505 the access node 105 may determine whether data is available to be transmitted via a first communication link using a radio access technology (RAT) that supports a synchronized frame structure. The operations of block 1505 may be performed according to the methods described with reference to FIGS. 1 through 9. In certain examples, aspects of the operations of block 1505 may be performed by a data manager as described with reference to FIGS. 10 through 13.

At block 1510 the access node 105 may receive an indication whether a scheduled resource of a second communication link is available during a time interval defined by the synchronized frame structure. The operations of block 1510 may be performed according to the methods described with reference to FIGS. 1 through 9. In certain examples, aspects of the operations of block 1510 may be performed by a resource availability manager as described with reference to FIGS. 10 through 13.

At block 1515 the access node 105 may receive a second indication being indicative of whether a schedule resource of a third communication link is available during the time interval. The operations of block 1515 may be performed according to the methods described with reference to FIGS. 1 through 9. In certain examples, aspects of the operations of block 1515 may be performed by a resource availability manager as described with reference to FIGS. 10 through 13.

At block 1520 the access node 105 may transmit the data via the first communication link during the time interval is further based at least in part on the second communication link and the third communication link being available during the time interval. The operations of block 1520 may be performed according to the methods described with reference to FIGS. 1 through 9. In certain examples, aspects of the operations of block 1520 may be performed by a data manager as described with reference to FIGS. 10 through 13.

At block 1525 the access node 105 may transmit the data via the first communication link using the scheduled resource during the time interval based at least in part on the indication indicating that the scheduled resource of the second communication link is available during the time interval. The operations of block 1525 may be performed according to the methods described with reference to FIGS. 1 through 9. In certain examples, aspects of the operations of block 1525 may be performed by a data manager as described with reference to FIGS. 10 through 13.

Figure 16:
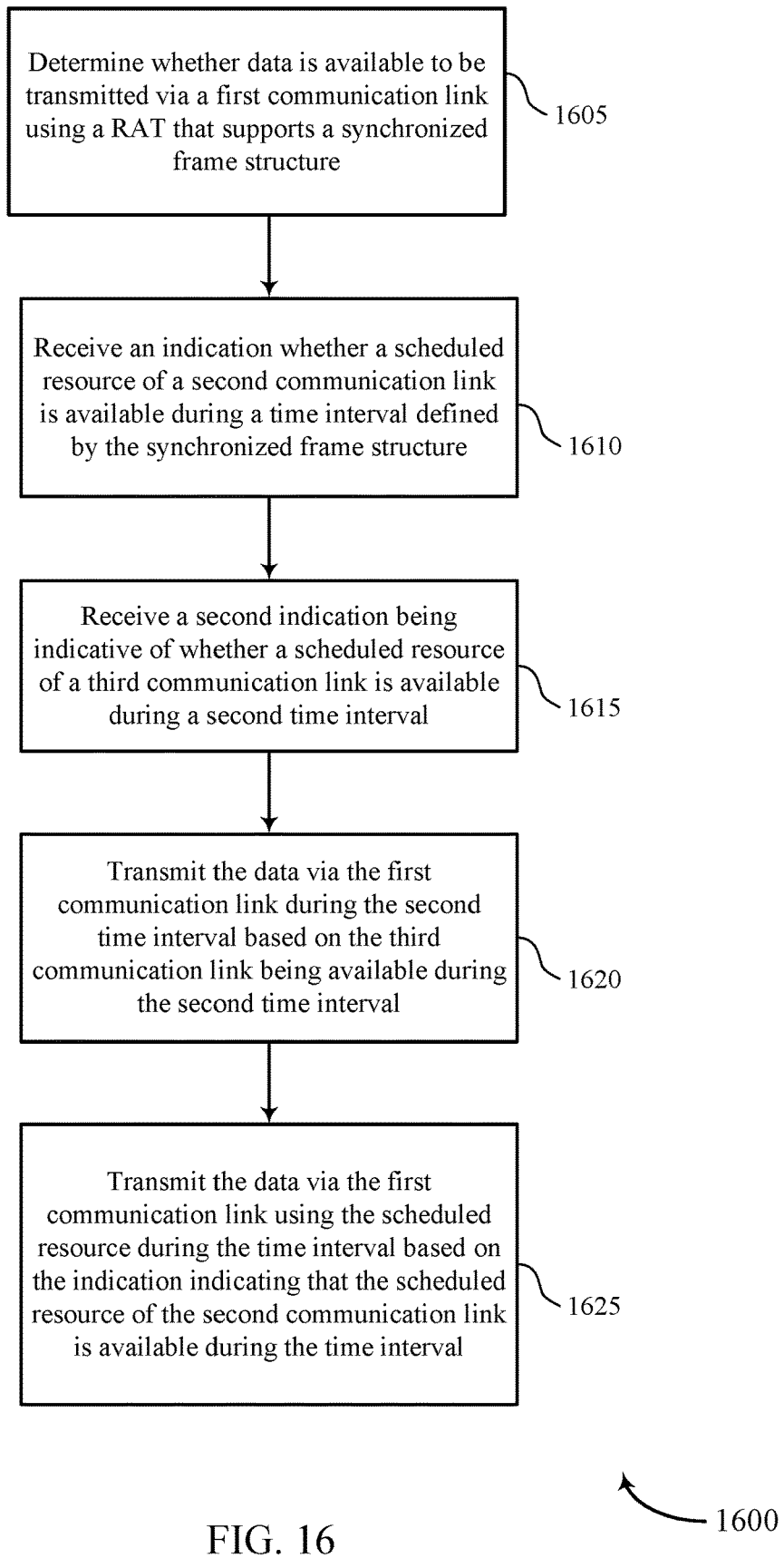

FIG. 16 shows a flowchart illustrating a method 1600 for dynamic resource allocation in a wireless network in accordance with various aspects of the present disclosure. The operations of method 1600 may be implemented by an access node 105 or its components as described herein. For example, the operations of method 1600 may be performed by a communications manager as described with reference to FIGS. 10 through 13. In some examples, an access node 105 may execute a set of codes to control the functional elements of the device to perform the functions described below. Additionally or alternatively, the access node 105 may perform aspects the functions described below using special-purpose hardware.

At block 1605 the access node 105 may determine whether data is available to be transmitted via a first communication link using a radio access technology (RAT) that supports a synchronized frame structure. The operations of block 1605 may be performed according to the methods described with reference to FIGS. 1 through 9. In certain examples, aspects of the operations of block 1605 may be performed by a data manager as described with reference to FIGS. 10 through 13.

At block 1610 the access node 105 may receive an indication whether a scheduled resource of a second communication link is available during a time interval defined by the synchronized frame structure. The operations of block 1610 may be performed according to the methods described with reference to FIGS. 1 through 9. In certain examples, aspects of the operations of block 1610 may be performed by a resource availability manager as described with reference to FIGS. 10 through 13.

At block 1615 the access node 105 may receive a second indication being indicative of whether a scheduled resource of a third communication link is available during a second time interval. The operations of block 1615 may be performed according to the methods described with reference to FIGS. 1 through 9. In certain examples, aspects of the operations of block 1615 may be performed by a resource availability manager as described with reference to FIGS. 10 through 13.

At block 1620 the access node 105 may transmit the data via the first communication link during the second time interval based at least in part on the third communication link being available during the second time interval. The operations of block 1620 may be performed according to the methods described with reference to FIGS. 1 through 9. In certain examples, aspects of the operations of block 1620 may be performed by a data manager as described with reference to FIGS. 10 through 13.

At block 1625 the access node 105 may transmit the data via the first communication link using the scheduled resource during the time interval based at least in part on the indication indicating that the scheduled resource of the second communication link is available during the time interval. The operations of block 1625 may be performed according to the methods described with reference to FIGS. 1 through 9. In certain examples, aspects of the operations of block 1625 may be performed by a data manager as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the access nodes. In other examples, the term base station may be used to describe the access nodes. The wireless communications system or systems described herein may include a heterogeneous LTE/LTE-A network in which different types of evolved node B (eNBs) provide coverage for various geographical regions. For example, each eNB or access node may provide communication coverage for a macro cell, a small cell, or other types of cell. The term "cell" may be used to describe an access node, a carrier or component carrier associated with an access node, or a coverage area (e.g., sector, etc.) of a carrier or access node, depending on context.

Access nodes may include or may be referred to by those skilled in the art as a base transceiver station, a radio access node, an access point, a radio transceiver, a NodeB, eNodeB (eNB), Home NodeB, a Home eNodeB, or some other suitable terminology. The geographic coverage area for an access node may be divided into sectors making up only a portion of the coverage area. The wireless communications system or systems described herein may include access nodes of different types (e.g., macro or small cell access nodes). The UEs described herein may be able to communicate with various types of access nodes and network equipment including macro eNBs, small cell eNBs, relay access nodes, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered access node, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of access nodes and network equipment including macro eNBs, small cell eNBs, relay access nodes, and the like.

The wireless communications system or systems described herein may support synchronous or asynchronous operation. For synchronous operation, the access nodes may have similar frame timing, and transmissions from different access nodes may be approximately aligned in time. For asynchronous operation, the access nodes may have different frame timing, and transmissions from different access nodes may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a wireless backhaul network, comprising:

determining whether data is available to be transmitted by a first access node to a second access node via a first communication link using a radio access technology (RAT) that supports a synchronized frame structure, wherein the first communication link is a backhaul link, and wherein the first access node acts as an access node for communications on the first communication link by being configured to schedule one or more transmissions on the first communication link;

receiving, at the first access node and from a first wireless node, an indication of whether a scheduled resource of a second communication link associated with the first wireless node, time synchronized with the first communication link, is available during a time interval defined by the synchronized frame structure, wherein the first access node acts as a user equipment (UE) for communications on the second communication link by being configured to communicate via the second communication link when scheduled by the first wireless node; and transmitting, by the first access node, the data via the first communication link using the scheduled resource during the time interval based at least in part on the indication indicating that the scheduled resource of the second communication link is available during the time interval.

2. The method of claim 1, further comprising:
receiving a second indication being indicative of whether a scheduled resource of a third communication link between the first access node and a second wireless node is available during the time interval; and
transmitting the data via the first communication link during the time interval is further based at least in part on the second communication link and the third communication link being available during the time interval.

3. The method of claim 1, further comprising:
receiving a second indication being indicative of whether a scheduled resource of a third communication link between the first wireless node and a second wireless node is available during a second time interval; and
transmitting the data via the first communication link during the second time interval based at least in part on the third communication link being available during the second time interval.

4. The method of claim 1, further comprising:
forwarding the indication based at least in part on whether the first access node, the second access node, or the first wireless node schedules transmissions on the first communication link.

5. The method of claim 1, further comprising:
determining an availability of a scheduled resource for transmission of data on the first communication link; and
transmitting a second indication based at least in part on a scheduled resource of the first communication link being available.

6. The method of claim 1, wherein:
the first wireless node functions as an access node for the second communication link by being configured to schedule transmissions on the second communication link.

7. The method of claim 1, wherein:
the first wireless node transmits the indication if the scheduled resource of the second communication link is available during the time interval.

8. The method of claim 1, wherein:
the indication includes identifying information about a scheduled resource defined by the synchronized frame structure.

9. The method of claim 1, wherein:
the synchronized frame structure is for uplink transmissions and downlink transmissions and defines the scheduled resources, each scheduled resource including a control portion and a data portion; and
the indication is transmitted via the control portion.

10. The method of claim 9, wherein transmitting the data via the first communication link during the time interval further comprises:
transmitting, via the first communication link, only during the data portion of the scheduled resource of the time interval.

11. The method of claim 10, wherein transmitting the data via the first communication link during the time interval further comprises transmitting uplink control data during a first portion of the data portion of the scheduled resource of the time interval, wherein the method further comprises:
transmitting the data during a second portion of the data portion of the scheduled resource of the time interval.

12. The method of claim 1, wherein a first subset of scheduled resources defined by the synchronized frame structure are assigned to be used by the first communication link and a second subset of scheduled resources defined by the synchronized frame structure are assigned to be used by the second communication link, the first subset being different than the second subset.

13. The method of claim 12, wherein the first subset or the second subset of scheduled resources includes at least one of a time interval, a frequency band, a code, an antenna beam, or a combination thereof.

14. The method of claim 1, wherein the second communication link is a wireless backhaul link.

15. The method of claim 1, wherein the RAT comprises a millimeter wave RAT.

16. An apparatus for wireless communication in a wireless backhaul network, comprising:
a processor;
memory in electronic communication with the processor; and
instructions stored in the memory and operable, when executed by the processor, to cause the apparatus to:
determine whether data is available to be transmitted by a first access node to a second access node via a first communication link using a radio access technology (RAT) that supports a synchronized frame structure, wherein the first communication link is a backhaul link, and wherein the first access node acts as an access node for communications on the first communication link by being configured to schedule one or more transmissions on the first communication link;
receive, at the first access node and from a first wireless node, an indication of whether a scheduled resource of a second communication link associated with the first wireless node, time synchronized with the first communication link, is available during a time interval defined by the synchronized frame structure, wherein the first access node acts as a user equipment (UE) for communications on the second communication link by being configured to communicate via the second communication link when scheduled by the first wireless node; and
transmit, by the first access node, the data via the first communication link using the scheduled resource during the time interval based at least in part on the indication indicating that the scheduled resource of the second communication link is available during the time interval.

17. The apparatus of claim 16, wherein the instructions are further executable by the processor to:
receive a second indication being indicative of whether a scheduled resource of a third communication link between the first access node and a second wireless node is available during the time interval; and
transmit the data via the first communication link during the time interval is further based at least in part on the second communication link and the third communication link being available during the time interval.

18. The apparatus of claim 16, wherein the instructions are further executable by the processor to:
receive a second indication being indicative of whether a scheduled resource of a third communication link between the first wireless node and a second wireless node is available during a second time interval; and transmit the data via the first communication link during the second time interval based at least in part on the third communication link being available during the second time interval.

19. The apparatus of claim 16, wherein the instructions are further executable by the processor to:
forward the indication based at least in part on whether the first access node, the second access node, or the first wireless node schedules transmissions on the first communication link.

20. The apparatus of claim 16, wherein the instructions are further executable by the processor to:
determine an availability of a scheduled resource for transmission of data on the first communication link; and
transmit a second indication based at least in part on a scheduled resource of the first communication link being available.

21. The apparatus of claim 16, wherein:
the synchronized frame structure is for uplink transmissions and downlink transmissions and defines the scheduled resources, each scheduled resource including a control portion and a data portion; and
the indication is transmitted via the control portion.

22. The apparatus of claim 21, wherein to transmit the data via the first communication link during the time interval includes instructions that are further executable by the processor to:
transmit via the first communication link during only the data portion of the scheduled resource of the time interval.

23. The apparatus of claim 22, wherein to transmit the data via the first communication link during the time interval includes instructions that are further executable by the processor to transmit uplink control data during a first portion of the data portion of the scheduled resource of the time interval, wherein the instructions are further executable to:
transmit the data during a second portion of the data portion of the scheduled resource of the time interval.

24. An apparatus for wireless communication in a wireless backhaul network, comprising:
means for determining whether data is available to be transmitted by a first access node to a second access node via a first communication link using a radio access technology (RAT) that supports a synchronized frame structure, wherein the first communication link is a backhaul link, and wherein the first access node acts as an access node for communications on the first communication link by being configured to schedule one or more transmissions on the first communication link;
means for receiving, at the first access node and from a first wireless node, an indication of whether a scheduled resource of a second communication link associated with the first wireless node, time synchronized with the first communication link, is available during a time interval defined by the synchronized frame structure, wherein the first access node acts as a user equipment (UE) for communications on the second communication link by being configured to communicate via the second communication link when scheduled by the first wireless node; and
means for transmitting, by the first access node, the data via the first communication link using the scheduled resource during the time interval based at least in part on the indication indicating that the scheduled resource of the second communication link is available during the time interval.

25. The apparatus of claim 24, further comprising:
means for receiving a second indication being indicative of whether a scheduled resource of a third communication link between the first access node and a second wireless node is available during the time interval; and
means for transmitting the data via the first communication link during the time interval is further based at least in part on the second communication link and the third communication link being available during the time interval.

26. The apparatus of claim 24, further comprising:
means for receiving a second indication being indicative of whether a scheduled resource of a third communication link between the first wireless node and a second wireless node is available during a second time interval; and
means for transmitting the data via the first communication link during the second time interval based at least in part on the third communication link being available during the second time interval.

27. The apparatus of claim 24, further comprising:
means for forwarding the indication based at least in part on whether the first access node, the second access node, or the first wireless node schedules transmissions on the first communication link.

28. A non-transitory computer-readable medium storing code for wireless communication, the code comprising instructions executable by a processor to:
determine whether data is available to be transmitted by a first access node to a second access node via a first communication link using a radio access technology (RAT) that supports a synchronized frame structure, wherein the first communication link is a backhaul link, and wherein the first access node acts as an access node for communications on the first communication link by being configured to schedule one or more transmissions on the first communication link;
receive, at the first access node and from a first wireless node, an indication of whether a scheduled resource of a second communication link associated with the first wireless node, time synchronized with the first communication link, is available during a time interval defined by the synchronized frame structure, wherein the first access node acts as a user equipment (UE) for communications on the second communication link by being configured to communicate via the second communication link when scheduled by the first wireless node; and
transmit, by the first access node, the data via the first communication link using the scheduled resource during the time interval based at least in part on the indication indicating that the scheduled resource of the second communication link is available during the time interval.

29. The non-transitory computer-readable medium of claim 28, the code further comprising instructions executable by the processor to:
receive a second indication being indicative of whether a scheduled resource of a third communication link between the first access node and a second wireless node is available during the time interval; and
transmit the data via the first communication link during the time interval is further based at least in part on the second communication link and the third communication link being available during the time interval.

30. The non-transitory computer-readable medium of claim 28, the code further comprising instructions executable by the processor to:

receive a second indication being indicative of whether a scheduled resource of a third communication link between the first wireless node and a second wireless node is available during a second time interval; and transmit the data via the first communication link during the second time interval based at least in part on the third communication link being available during the second time interval.

* * * * *